United States Patent
Cunningham et al.

(10) Patent No.: US 12,309,635 B2
(45) Date of Patent: *May 20, 2025

(54) MANAGEMENT OF DATA COMMUNICATION CONNECTIONS

(71) Applicant: Connectify, Inc., Philadelphia, PA (US)

(72) Inventors: Kevin Cunningham, Swarthmore, PA (US); Brian Prodoehl, Plymouth Meeting, PA (US); Alexander Gizis, Philadelphia, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/089,325

(22) Filed: Dec. 27, 2022

(65) Prior Publication Data

US 2023/0135588 A1   May 4, 2023

Related U.S. Application Data

(63) Continuation of application No. 17/204,814, filed on Mar. 17, 2021, now Pat. No. 11,570,660.

(60) Provisional application No. 62/991,171, filed on Mar. 18, 2020.

(51) Int. Cl.
| | | |
|---|---|---|
| *H04W 28/04* | (2009.01) | |
| *H04W 24/04* | (2009.01) | |
| *H04W 24/08* | (2009.01) | |
| *H04W 80/06* | (2009.01) | |
| *H04W 84/12* | (2009.01) | |

(52) U.S. Cl.
CPC .......... *H04W 28/04* (2013.01); *H04W 24/04* (2013.01); *H04W 24/08* (2013.01); *H04W 80/06* (2013.01); *H04W 84/12* (2013.01)

(58) Field of Classification Search
CPC ..... H04W 28/04; H04W 24/04; H04W 24/08; H04W 80/06; H04W 84/12; H04L 1/1825; H04L 63/166; H04L 63/0478; H04L 63/0272
See application file for complete search history.

(56) References Cited

U.S. PATENT DOCUMENTS

| | | | | |
|---|---|---|---|---|
| 2006/0171353 A1* | 8/2006 | Nagata | ................ | H04L 27/2601 370/445 |
| 2008/0080430 A1* | 4/2008 | Choi | ................... | H04W 24/04 370/332 |
| 2009/0201862 A1* | 8/2009 | Okker | ................ | H04W 72/569 455/70 |

(Continued)

*Primary Examiner* — Meng Vang
*Assistant Examiner* — Hector Reyes
(74) *Attorney, Agent, or Firm* — Kamran Emdadi

(57) ABSTRACT

One example method of operation may include transmitting, via a first computer device to a second computer device, a first portion of packets of a data stream over a first channel and a second portion of the packets of the data stream over a second channel bonded with the first channel, and the first portion and the second portion include different packets of the data stream, determining the data stream experienced a potential network communication error, and retransmitting at least a portion of the data stream packets over a mirrored channel transmission with the first and second channels which both retransmit in parallel at least a same portion of the retransmitted portion of the data stream.

16 Claims, 16 Drawing Sheets

(56) References Cited

U.S. PATENT DOCUMENTS

| | | | |
|---|---|---|---|
| 2015/0105121 A1* | 4/2015 | Emmanuel | H04W 74/002 |
| | | | 455/553.1 |
| 2015/0181638 A1* | 6/2015 | Tabet | H04W 28/085 |
| | | | 370/329 |
| 2015/0350598 A1* | 12/2015 | Yang | H04L 65/1083 |
| | | | 348/14.02 |
| 2016/0295557 A1* | 10/2016 | Azarian Yazdi | H04L 1/1671 |
| 2019/0058550 A1* | 2/2019 | Kim | H04L 1/1825 |
| 2019/0246429 A1 | 8/2019 | Takinami | |
| 2020/0008248 A1* | 1/2020 | Beck | H04W 76/15 |
| 2020/0077417 A1 | 3/2020 | Seok | |
| 2020/0119853 A1 | 4/2020 | Shawky | |
| 2021/0112615 A1* | 4/2021 | Huang | H04W 76/15 |
| 2021/0400537 A1 | 12/2021 | Zhang | |

* cited by examiner

MANAGEMENT OF DATA COMMUNICATION CONNECTIONS

BACKGROUND

The Open Systems Interconnection model (OSI model) is a conceptual model that standardizes communication functions in a telecommunication or computing system. Layer 3 of the OSI model—the Network Layer—provides functional and procedural transfer of data sequences from node to node within a network. For example, the Internet Protocol (IP) is a networking layer protocol that enables packets to be routed or switched within an IP network. Layer 4 of the OSI model—the Transport Layer—provides functional and procedural transfer of data sequences from source to destination.

The Transport Layer is one layer in a layered architecture of protocols. Exemplary protocol layer architectures include the Internet protocol suite and the OSI model. The Transport Layer accepts data, splits it into smaller units such as packets, enables transport of those units, and reassembles the units at their destination. The Transport Layer thus provides end-to-end communication, which can also be described as providing data transfer between applications. Thus, the Transport Layer allows application-oriented communication independently of network characteristics by transferring packets from source to destination. Transport Layer protocols are known, including ATP, DCCP, RDP, SPX, TCP and UDP.

TCP and UDP are two common examples of Transport Layer protocols that are well known in the art of computer networking. Each protocol controls packet flow between source point and destination point. Each type of Transport Layer protocol (e.g., TCP, UDP, etc.) has advantages and disadvantages that affect their suitability for certain types of data transmissions.

The use of TCP and UDP are now described as examples.

TCP is a connection-based protocol. Communication via TCP begins with a three-way handshake as follows: Source sends SYN to Destination, Destination responds by sending SYN-ACK to Source, Source responds by sending ACK to Destination. In this manner a connection is established between Source and Destination (which is why TCP is described as a connection-oriented protocol). Data transmission between Source and Destination then begins.

By using a windowing system, TCP sends the receiver (Destination) a group of packets. The receiver performs a data validity check and then sends an ACK (acknowledge) or NAK (not-acknowledge) back to the transmitter (Source). The next group of packets in the sequence is sent if an ACK is received. The original group of packets are resent if the transmitter receives a NAK or if the transmitter times out.

TCP header size is 20 bytes. Common TCP header fields include Source port, Destination port, and checksum. Additional fields include Sequence Number and Ack Number. A reserved header field 6 (all zeros) is also included.

The advantage of the above mechanism is that TCP can confirm that a block of data (such as the contents of a file) was received by a Destination (or determine that some or all of the data was not received by the Destination). TCP is useful when accurate transmission (and reception) of data packets is required/desired. TCP has become the dominant protocol for Internet connectivity, because of its ability to partition into individual packets large sets of data, check for and resend lost packets, and reassemble packets in the correct sequence. All of these attributes are significant advantages. There is, however, a cost: use of TCP results in overhead and delays (latency). If one or more packets are received at a remote access point with error(s), packet delivery may be delayed at the Destination until the error is corrected.

TCP has also been known to suffer with another weakness: when TCP is implemented, there is an equal sensitivity to random loss and congestion loss, and discrimination between the two may not occur. In other words, sporadic losses due to radio channel problems may be misinterpreted as a symptom of congestion. As a consequence, network devices may react to loss by reducing the transmission (congestion) window, and thus the sender transmission rate. The exact behavior may vary depending on the particular congestion control algorithm being used, but it is known in the art that a large reduction in overall speed may occur responsive to packet loss. Some congestion control algorithms may be less susceptible to this issue, but when TCP is used, it is an issue nonetheless. For example, in such a situation, a better strategy might be to not decrease retransmission rate.

UDP is a connectionless protocol. Communication via UDP (typically) does not include handshaking (enhancements to UDP may include handshaking). One program sends multiple packets to another program and the relationship between the two programs (typically) ends.

UDP header size is 8 bytes. There are four UDP header fields that are two bytes each: Source port (port number of the sender), Destination port (port number the data is addressed to), length (length in bytes of the UDP header and any encapsulated data); and Checksum (used for error checking). The use of the Checksum and Source port fields are optional in IPv4. In IPv6, the Source port field is optional. A "pseudo header" is used for UDP checksum calculation.

UDP is useful when lack of perceived latency is critical, such as gaming, voice and video communication. Latency when perceived in such situations has an adverse effect. Often in these applications, some data loss can occur without adversely affecting perceived quality. Furthermore, in some situations, forward error correction can be used to improve audio/video quality despite some losses. In these types of situations, getting data to its destination in a timely manner takes priority over getting data to its destination without error. If a voice transmission, for example, is delivered at its destination (during a conversation) with a few errors, the transmission will often be intelligible. But, if the user at the Destination needs to wait for errors to be corrected before the transmission is delivered, then the delay (while the errors are being corrected) may adversely affect the quality of the conversation.

UDP is also useful when applications have their own methods of responding to packets. For example, users can decide themselves when to respond to information that is incorrect. To summarize, here are some of the characteristics of TCP: Connection-oriented protocol; Most widely used protocol on the Internet; Confirm whether all data reaches the intended recipient; Ability to resend lost data; Sends packets in order; Slower than UDP and requires more resources than UDP; Bigger header than UDP; Preferable to use when high reliability is desired, and transmission time is less critical.

To summarize, here are some of the characteristics of UDP: Connectionless protocol; Useful for video streaming and VoIP; Faster than TCP and requires fewer resources; Packets may not arrive at Destination in order; Sender does not know whether a packet has been received; Better suited for applications that need timely data reception.

It may be helpful to know the latency when TCP or UDP packets are sent over a network. One way to obtain this information is for a Source to send a TCP (or UDP) packet to a Destination and then for the Destination to generate a timestamp when the packet is received. The packet is then sent back to the Source with the timestamp. By comparing the timestamp with the time at which the Source sent the packet, it is possible to calculate the latency of packet travel from the Source to the Destination. Another method of measuring speed is to insert a timestamp into a packet as it is being transmitted from a Source, return the packet to the Source once received at the Destination, and to compare the timestamp with the time at which the packet is returned to the Source. That comparison yields the total round-trip delay. Using both methods together it is possible to also measure delay from the Destination to the Source. Alternatively, a return packet can include a timestamp before being sent from Destination to Source, and the timestamp can be compared to actual time of receipt at the Source to determine delay from Destination to Source.

A Virtual Private Network (VPN) enables secure connection between a computer device and at least a portion of a network. FIG. 1 illustrates two examples of a prior art Virtual Private Network 100. FIG. 1 illustrates one exemplary VPN (option A) and another exemplary VPN (option B). First computer 102 may communicate via a VPN as illustrated in option A, a VPN as illustrated in option B, both option A and option B, or some other form of a VPN. Each option will be discussed separately.

First, option A as illustrated in FIG. 1 will be described. The purpose of option A is to ensure that the contents of secure network 120 can only be accessed by authorized users.

As illustrated in FIG. 1, and as shown in option A, a secure connection exists between computer 102 ("first computer") and system 116 ("second computer"). This connection is made over Wide Area Network 114, such as the Internet, with security managed on the VPN layer by VPN client 108 and VPN server 118. Any software applications 104 on first computer 102 see VPN client 108 as a virtual network interface, appearing no different than the driver for a physical network interface 112. VPN client 108 (unless in a bypass mode) encapsulates all traffic sent to it as encrypted, private data, and then sends the encrypted data via driver 110 to physical network interface device 112, such as a Wi-Fi or Ethernet device. In this manner, VPN data is secure over unsecured Internet 114 because it is encrypted.

Within system 116, VPN server 118 authenticates VPN client 108, and decrypts encrypted data. VPN client 108 is also capable of decrypting encrypted data received from VPN server 118, so that communication and traffic is encrypted in both signal directions and is two-way secure. In this manner, encrypted communication is available for the entire path between computer device 102 and a further computer device that is directly connected to secure network 120.

VPN server 118 also appears as a normal networking device to the server host operating system ("OS"), allowing access to the server's network software layer and network software clients 104 within the server computer. As a result, secure communication is achieved with secure network 120. The server may have its own physical network interfaces 113/115

Next, option B as illustrated in FIG. 1 will be described. The purpose of option B is to protect spying on Internet traffic from/to clients 102. Such spying may take place by hackers on the same Wi-Fi network as client 102, or by the Internet Service Provider (ISP) of client 102. Option B may be implemented with or without option A.

Turning now to option B, data is secure for at least part of its transmission between computer device 102 ("first computer") and computer device 202. Option B relates to a configuration in which one computer device is associated with a VPN and another computer device included in system 117 may not be associated with a VPN. Data is encrypted via VPN client 108 before it is transmitted to Internet 114 via physical network interface 112. VPN server 130 receives the encrypted data from Internet 114, decrypts the received data, sends the unencrypted data to server 140 via Internet 114, and further sends the unencrypted data to second computer device 202 via Internet 114. The various applications and physical network interfaces illustrated in option A have not been drawn in system 117 (for clarity purposes, only).

Conversely, second computer device 202 may transmit data so that it is encrypted by VPN server 130 (after the data is transmitted to VPN server 130 via server 140). The encrypted data is then transmitted to computer device 102 via Internet 114. VPN client 108 decrypts the encrypted data before forwarding the decrypted data to client 104. In this manner data is encrypted from VPN server 130 to VPN client 108 and/or bi-directionally (for at least part of the path between computer device 102 and second computer device 202).

SUMMARY

Data is transferred between a first computer device and a second computer device. A continuous stream of packets are received from the first computer device wherein the received packets have been transmitted in accordance with a first protocol that provides data transfer between applications. The protocol may be a protocol that provides end-to-end communication. The protocol may be associated with a layer of a layered architecture (e.g. OSI). Exemplary protocols included TCP, UDP, and HTTPS. TCP and UDP are examples of protocols in the Transport Layer. The packets are encapsulated and. encrypted to obtain. encrypted packets. The encrypted packets are transmitted to the second computer device in a protocol that provides data transfer between applications. Again, the protocol may be a protocol that provides end-to-end communication. The protocol may be associated with a layer of a layered architecture (e.g. OSI). Exemplary protocols include TCP, UDP, and HTTPS. The second protocol may be transitioned between two or more protocols without transitioning the first protocol between two or more protocols.

Alternatively, or in addition, at least one VPN is established between the first computer device and the second computer device. Data is separated into a first group of packets and a second group of packets. The first group of packets is encrypted to form an encrypted first group of packets. The second group of packets is encrypted to form an encrypted second group of packets.

The encrypted first group of packets and the encrypted second group of packets are transmitted in parallel via a first access point and a second access point, respectively, between the first computer device and a VPN server, the first group of packets and the second group of packets transmitted with respectively different communication protocols, the parallel transmitting occurring in a first mode of operation of transferring the data. At least one of the encrypted first group of packets is detecting has having failed to reach the VPN server. Packets of the encrypted data are transmitted in parallel in a second mode of operation on both the first access point and the second access point to the VPN server responsive to the detecting. Visually displaying that transition to the second mode of operation optionally occurs.

The above description has referred to encryption/decryption as examples, but the present invention may also apply to data that is encapsulated/decapsulated (with or without encryption/decryption).

One example method may include transmitting a data stream from a first device to a second device via one or more channels, determining the data stream experienced a potential network communication error, and retransmitting at least a portion of the data stream over a mirrored channel transmission comprising at least two streams which both retransmit in parallel at least a same portion of the retransmitted portion of the data stream.

Another example embodiment may include an apparatus that includes a transmitter configured to transmit a data stream from a first device to a second device via one or more channels, and a processor configured to determine the data stream experienced a potential network communication error, and initiate a retransmission of at least a portion of the data stream over a mirrored channel transmission comprising at least two streams which both retransmit in parallel at least a same portion of the retransmitted portion of the data stream.

Still another example embodiment may include a non-transitory computer readable storage medium configured to store instructions that when executed cause a processor to perform transmitting a data stream from a first device to a second device via one or more channels, determining the data stream experienced a potential network communication error, and retransmitting at least a portion of the data stream over a mirrored channel transmission including at least two streams which both retransmit in parallel at least a same portion of the retransmitted portion of the data stream.

Another example may include a method that includes transmitting, via a first computer device to a second computer device, a first portion of packets of a data stream over a first channel and a second portion of the packets of the data stream over a second channel bonded with the first channel, and the first portion and the second portion include different packets of the data stream, determining the data stream experienced a potential network communication error, and retransmitting at least a portion of the data stream packets over a mirrored channel transmission with the first and second channels which both retransmit in parallel at least a same portion of the retransmitted portion of the data stream.

DETAILED DESCRIPTION

Figure 1:
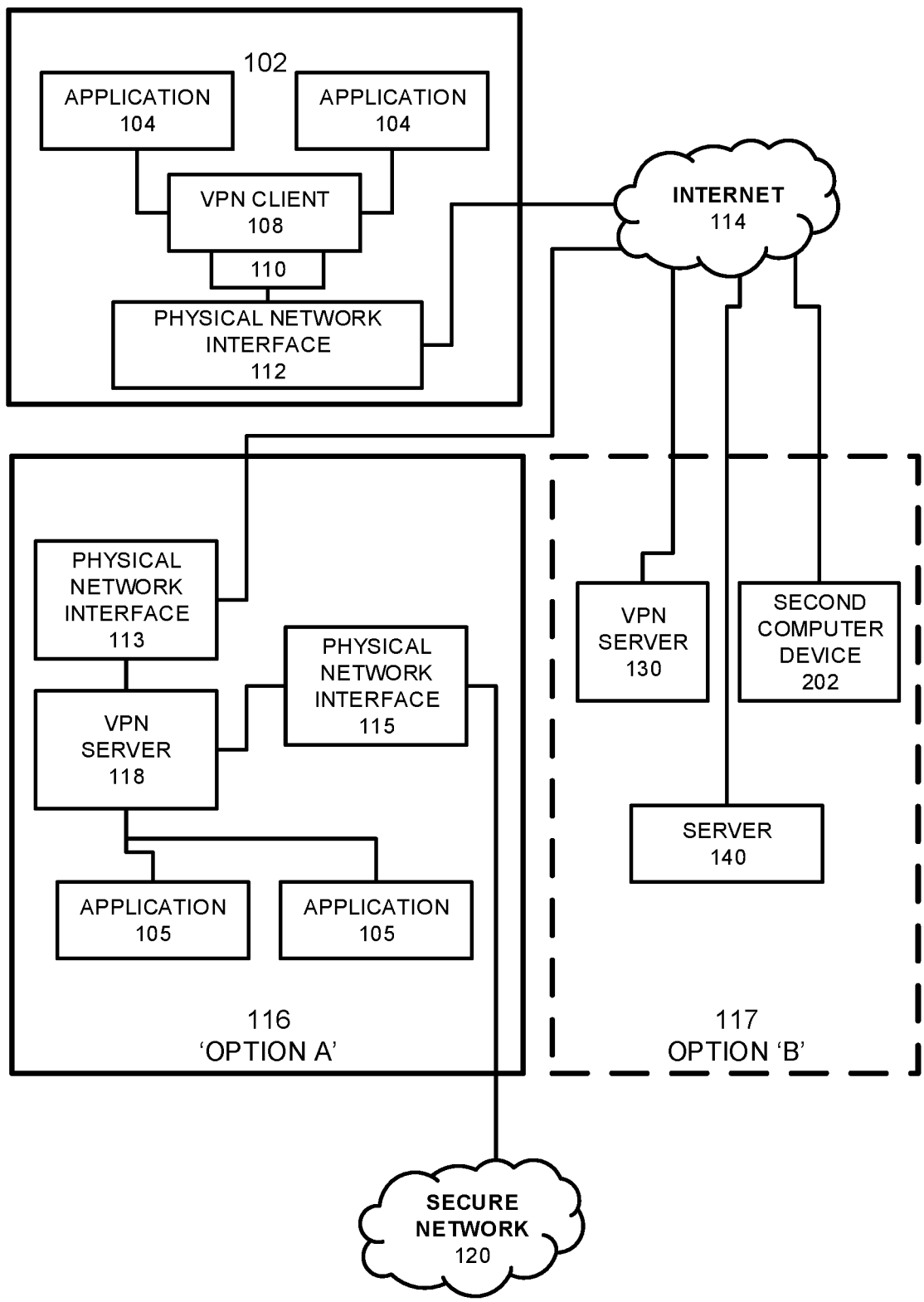
FIG. 1 is a block diagram of a system that permits communication between a first computer and one or more VPN servers in accordance with a conventional configuration.
Figure 2:
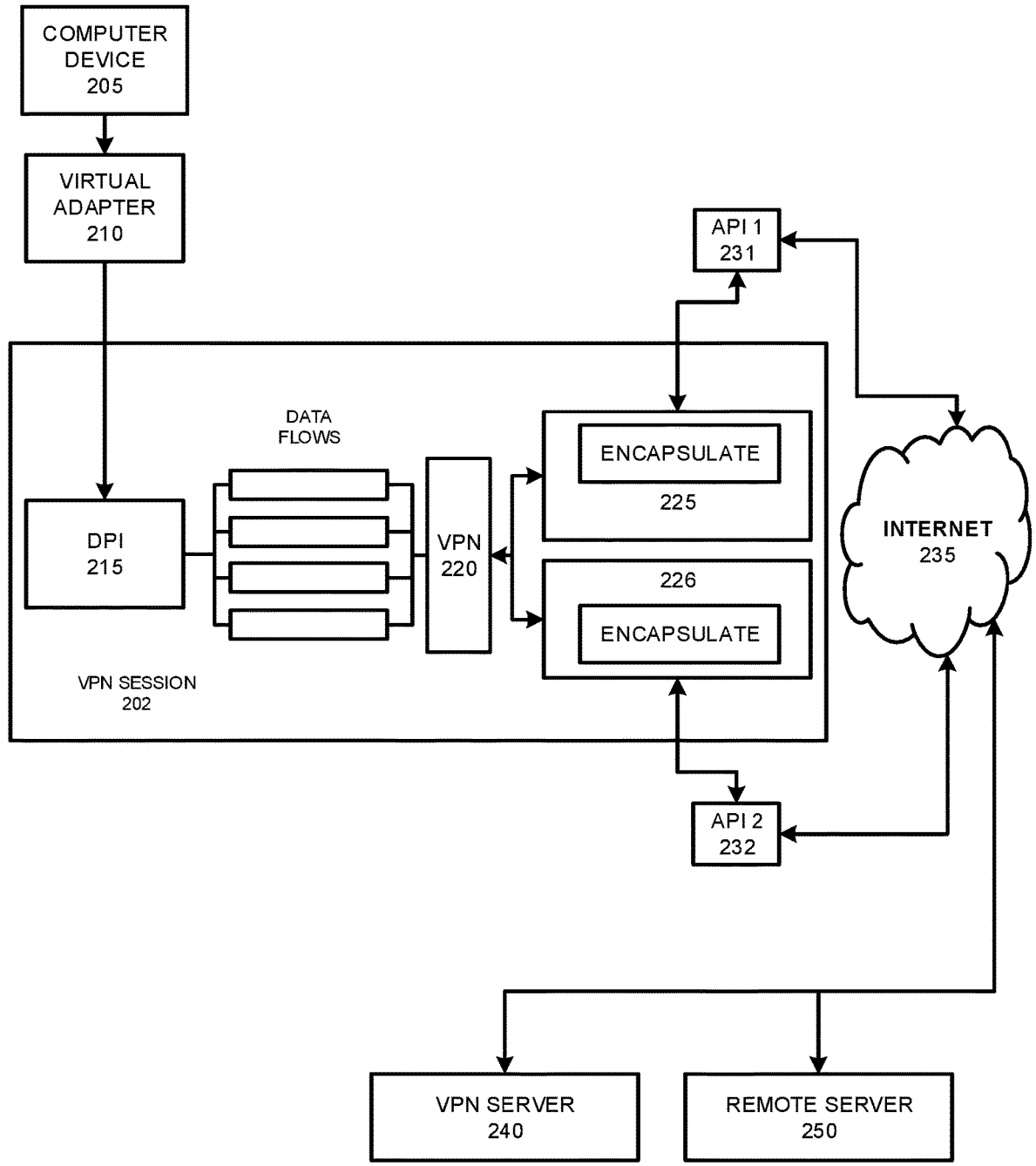
FIG. 2 is a block diagram of a first computer device communicating with a VPN server in accordance with one or more exemplary embodiments of the present invention.

FIG. 2 illustrates a block diagram of exemplary (first) computer device 205 communicating with exemplary VPN server 240 (e.g. second computer device) in accordance with an exemplary embodiment of the present invention. The exemplary figure shows that a data stream of data is transmitted (using a protocol that provides end-to-end communication and/or that provides data transfer between applications). In this exemplary figure, TCP protocol is shown as an example of a Transport Layer protocol, although the data stream may alternatively use another protocol (from the same or a different layer), such as UDP protocol (or other protocols), and another type of protocol (such as HTTPS). The previous examples are both Transport Layer protocols, although other protocols included in layered architectures (OSI or others) are permissible. The data stream is received by virtual adapter 210 so that packets can be pushed into the regular networking stack. Virtual adapter 210 is a virtual interface that accepts IP packets from one or more applications operated by computer device 205. Virtual adapter 210 is preferably used due to its ability to establish a VPN connection—since it gives the VPN software a chance to encrypt data before it is transmitted to the WAN.

An exemplary virtual adapter 210 may be (or include) a TUN, a TAP adapter (i.e., kernel adapters), or something similar that intercepts packets.

Data from Virtual Adapter 210 is provided to DPI (deep packet inspection) module 215. DPI 215 places the packets that it receives from Virtual adapter 210 into packet flows. Each packet flow is provided to VPN client 220 so that individual packets within a packet flow may be transmitted to VPN server 240. VPN client 220 schedules each packet within a packet flow for an available (or multiple available) access point. Packets are scheduled for access points based on calculations that are described below.

After scheduling each packet for an access point, each packet is encrypted. In an alternative embodiment, encryption occurs before packet scheduling.

VPN client 220 also determines whether each encrypted packet is transmitted to VPN server 240 using TCP protocol or using UDP protocol (these are only examples—other protocols are also possibilities). Various methods may be used to determine whether TCP protocol or UDP protocol is used with each packet identified.

In one example, VPN client 220 transmits test packets to VPN server 240 using TCP protocol and transmits test packets to VPN server 240 using UDP protocol. Each test packet may include a timestamp, and the remote server may be programmed to identify a test packet (due to the inclusion of unique identifying data), and to return the test packet to VPN client 220 upon receipt. VPN client 220 compares the timestamp on a test packet that was sent with the time at which the test packet was returned to VPN client 220. By sending test packets using respectively different protocols (e.g., one or more test packets sent by TCP, one or more test packets sent by UDP), it is possible to determine which protocol to use for the fastest transmission of packets to a remote server.

In another example, VPN client 220 automatically transmits encrypted packets using TCP if the application that is transmitting packets to VPN client 220 is transmitting packets using TCP. Furthermore, VPN client 220 automatically transmits packets using UDP if the application that is transmitting packets to VPN client 220 is transmitting packets using UDP. As an example of how to determine whether an application is using TCP or UDP, the IPv4 header includes a "protocol" field—a protocol ID of '6' indicates TCP protocol, a protocol ID of '17' indicates UDP protocol. This method of identifying whether a packet has been transmitted using TCP protocol or UDP protocol is merely exemplary. Other protocols may be identified in other manners.

One aspect of the present invention is that packets may be transmitted to the WAN using UDP or TCP protocol (or another protocol), independently of whether packets being provided from an application (and directed towards the WAN) is provided using UDP or TCP (or another protocol).

To better understand the exemplary embodiments, it is noted that there is a protocol of the "application", i.e., the protocol the application (located in a source computer device) uses to transmit packets towards a remote computer device (which is or via a remote server, and via the WAN/Internet). There is also a protocol of the "carrier", i.e., the protocol of the transmission that is used by the VPN (or other system) to transmit the application data, after it has been encrypted (or otherwise encapsulated), towards a computer device such as a remote server (via the WAN/Internet). The application protocol may be described as "overlaying" the VPN. The application protocol and the carrier protocol may or may not be the same. TCP protocol data transmitted by the application may be further transmitted using TCP protocol as the carrier protocol. UDP protocol data transmitted by the application may be further transmitted using UDP protocol as the carrier protocol. TCP protocol data transmitted by the application may be further transmitted using UDP protocol as the carrier protocol. UDP protocol data transmitted by the application may be further transmitted using TCP protocol as the carrier protocol.

In some situations, greater data transmission speed may be obtained when TCP is the protocol of the application and TCP is the protocol of the carrier (than using UDP for either or both protocols). For example, faster data transmission may be achieved in certain situations (as determined, for example by evaluating timestamps included in packets) using TCP as the carrier protocol (when the application transmission uses TCP protocol) rather than using UDP as the carrier protocol (when the application transmission uses TCP protocol).

For example, UDP protocol is preferred for real time voice communication, as long as error rate stays low enough so that the conversation is intelligible. As previously explained, waiting to deliver a packet to a destination until all packets are ready for delivery (and without errors) may adversely affect the quality of a VoIP conversation. However, transmission of UDP packets may raise other issues.

For example, large packets can be sent over a network using UDP as the carrier protocol. On a reliable network (such as an Ethernet network), transmission of large UDP packets is readily performed. Issues may occur, however, when transmitting large UDP packets on a lossy network (such as a Wi-Fi network). In some cases, if a large UDP packet is transmitted over a network, the network itself may split up the packet into multiple fragments. If any of those fragments are lost, then the operating system will consider the entire packet to be lost (and none of the packet will be received at its destination). An alternative may be to separate a large packet into smaller fragments before the fragments are handed over to the operating system. If one fragment in such an example is lost while being transmitted over the network, the other fragments will be received at their destination. Also, the missing fragment can be requested (to be resent) rather than requesting that the entire packet be resent. It is more efficient to request resending a single missing fragment than to request retransmission of all of the data that comprised a packet.

In other words, depending upon the packet size at which the operating system separates a packet into fragments, it may be more efficient to separate a packet into fragments before the packet (in the form of fragments) is handed over to the operating system for transmission over the network. The use of TCP and UDP described above is merely exemplary.

Packet separation may occur in combination with other aspects of the present invention as described herein through one or more exemplary embodiments.

Often, a fixed packet size is chosen that is small enough to not need to be fragmented by the network.

Another aspect of one or more exemplary embodiments of the present invention relates to the Maximum Transmission Unit (MTU). This field relates to the largest frame size possible for a Protocol Data Unit (PDU) on an OSI Layer 2 data network. The size is based on the physical properties of the communication network, aspects thereof, and/or aspects of related sections. Most Ethernet networks use an MTU of 1500 bytes. Frame size may be larger (due to header, Frame Check Sequence (FCS), encapsulation/encryption, etc.).

IPv4 routers fragment packets unless the Do-Not-Fragment bit is set in the header. IPv6 routers do not fragment packets.

Another aspect of one or more embodiments of the present invention relates to the order in which fragmentation and encryption is performed. In some situations, fragmentation is performed before encryption. In this manner, the fragments do not need to be reassembled before performing decryption. In other situations, fragmentation may take place after encryption, but this may result in undesirable issues. For example, if an encrypted fragment is lost, reconstruction of the original packet is not possible, and retransmission of the entire packet is typically required.

In one exemplary embodiment of the present invention, protocol for the carrier layer (or any other layer) may be selected on the basis of whether the protocol performs segmentation (such as fragmentation), whether the protocol performs segmentation automatically, whether the amount of segmentation can be controlled, etc.

Another method of dealing with encapsulation is to adjust the size of packets. Fragmentation based on the MTU size occurs when a packet is sent that is larger than what the network can handle. Fragmentation may be avoided by changing packet size to be less than or equal to the MTU of the network.

TCP and UDP are each handled differently with regard to MSS and MTU. TCP can automatically detect the MSS/MTU for a TCP connection and automatically segment data to the correct size. Thus, TCP can handle data segmentation when a large block of data is received. UDP, on the other hand, does not perform size detection and simply sends data at any given size. If data is too large to be sent, fragmentation may be handled by the Network Layer.

Thus, with regard to UDP transmissions, packets may be separated into smaller fragments before the operating system performs fragmentation. The decision of whether to perform fragmentation, before fragmentation is performed by the operating system, and the size of the fragments may be determined based on network characteristics. Exemplary characteristics include loss, bandwidth, etc. Such characteristics of different protocols may form the basis of choosing which protocol to use for data transmission, in accordance with one or more exemplary embodiments of the present invention.

A further aspect of the present invention relates to identifying the application protocol and choosing the transport protocol based on the application protocol. Identifying the application protocol can be accomplished in several ways, including evaluating header size, port number, header features (the protocol stored in the IP header, the reserved field in the TCP header, etc.).

Example embodiments may be referred to with reference to a communication 'session'. The term session may be a communication data link between a client and server or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session among other device resources. Multiple transport connections which are established via TCP and/or UDP may also be considered a session. Additionally, encryption that is used for the session may be independently established to include a unique key for each transport connection and/or channel established for the session. The session encryption may instead by a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

Returning to FIG. 2, once packet flows are assembled as part of the VPN session 202 by DPI 215, VPN client 220 schedules the packets for specific Access Points 231,232, and provides the packets to connection units 225, 226. Connection units 225, 226 encrypt and/or encapsulate the packets (i.e., using DTLS, for example) and transmits the encrypted packets to Access Points 231, 232 using (for example) either TCP protocol or UDP protocol. Whether to transmit the encrypted flows using TCP protocol or UDP protocol (or another protocol) may be determined using one or more of the criteria indicated above, or other criteria.

Packets are transmitted from Access Points 231, 232 to WAN/Internet 235 and are subsequently received by VPN server 240. The packets are then decrypted and further processed as needed (e.g. responded to, forwarded to a remote server via WAN/Internet 235, forwarded to a secure LAN, etc.).

In a bonded VPN, data packets are allocated to multiple channels (i.e., some data packets are allocated to one channel while other data packets are allocated to another channel) in order to increase communication bandwidth. Alternatively, the packets may be mirrored when they are transmitted to Access Points 231, 232 (i.e., the same packets are transmitted to both access points). A combination of bonding and mirroring may also occur (i.e., some packets are transmitted on two channels while other packets are transmitted on only one of the two channels). In either case, the packets may be transmitted on the channels using TCP protocol on both channels, UDP protocol on both channels, or TCP protocol on one channel and UDP protocol on the other channel (and/or other protocols). The (transport) protocol may be independent of the (application) protocol with which packets are transmitted towards VPN server 240 via applications in computer device 205.

Once packets are received by VPN server 240, VPN server 240 may rearrange the packets in their initial order (or this step may be deferred until later). The packets may then be decrypted and delivered to their intended destination. "Destination" may have more than one definition. The destination may be, for example, a user terminal with a secure connection to VPN server 240 (via, for example, a secure LAN). The destination may be, for example, a user terminal that communicates (over the Internet, for example) with VPN server 240 via remote server 250. The destination may be VPN server 240 (when responding, for example, to timestamped data from VPN client 220 in order to measure delay over various channels). If not previously rearranged into correct order, the packets may be rearranged into correct order at the ultimate destination, or some intermediate destination. Data may be extracted from packets and reassembled into the format in which it existed prior to being formatted as packets.

After packets transmitted by VPN client 220 are received by VPN server 240 (or a subsequent destination), a response may be provided. Transmitting a response is essentially the reverse process of transmitting packets from VPN client 220 to VPN server 240, with the caveat that the protocol used in the response may be the same or different than the protocol used in the transmission from VPN client 220 to VPN server 240. For example, the transmission from client 220 to server 240 may use TCP protocol as the underlying application layer and TCP protocol as the transport layer, while the transmission from server 240 to client 220 may use UDP protocol as the underlying application layer and UDP protocol as the transport layer. Other combinations are possible in either direction, with the combination in one direction being the same or different than the combination in the other direction (e.g., down direction/back direction, TCP/UDP and UDP/TCP, UDP/TCP and TCP/UDP, UDP/UDP and TCP/TCP, and other protocols and/or combinations, etc.). Furthermore, the combination of protocols in any direction may change one or more times in any communication session.

In summary, packets transmitted by VPN server 240 may be scheduled to AP1 231 and/or AP2 232. Those packets may then be encrypted and transmitted to AP1 231 and/or AP2 232 via Internet 235—and using TCP or UDP (or another protocol) as the carrier protocol. The decision as to which protocol to use for the carrier protocol may be based on similar (or different) criteria as was used to determine the carrier protocol in the opposite direction.

In one exemplary embodiment of the present invention, the application protocol is one of two protocols and the carrier protocol is the same one of two protocols.

In one exemplary embodiment of the present invention, the application protocol is one of two or more protocols and the carrier protocol is one of two or more protocols. At least one protocol may or may not be common to the application protocol and the carrier protocol. In other words, there may be an application protocol that is not also a carrier protocol, and/or there may be a carrier protocol that is not also an application protocol.

In one exemplary embodiment of the present invention, the application protocol may be other than any of the carrier protocols.

In one exemplary embodiment of the present invention, the carrier protocol may be other than any of the application protocols.

In some embodiments, the application protocol and the carrier protocol switch between two common protocols. However, the invention is not limited as such. In some embodiments, the application protocol and carrier protocol switch between two or more protocols, and the protocols may or may not be common to the application protocol and the carrier protocol.

In some embodiments, the application protocol transitions between two or more protocols while the carrier protocol does not transition during a continuous streaming event.

In the exemplary embodiments set forth above, there may or may not be at least a protocol common to the available application protocols and available carrier protocols.

In the exemplary embodiments set forth above, there may be an application protocol that is not included in available carrier protocols. Alternatively, or in addition, there may be a carrier protocol that is not included in available application protocols.

In the above embodiments, when the application protocol and/or the carrier protocol transitions, the transition may be to a protocol that is or is not an application protocol or carrier protocol that did not transition.

The above explanations relate to data that is transmitted (and/or received) on multiple channels (for example, multiple channels that are between a computer device and a WAN such as the Internet). As explained, however, whether data is transmitted on bonded and/or mirrored connections (or a combination thereof), how data is allocated between multiple connections, and over which connection (or connections) data is transmitted may be subject to one or more conditions (such as speed, error rate, delay, quality, cost, etc.) over each connection. In some exemplary situations, one factor may be more important (or less important) than others. For example, if large quantities of data are transmitted, bandwidth may take a priority. For some communications, however, cost may take a priority (use of a cheaper channel (WIFI) may be preferable to a more expensive channel (cellular)). In yet other situations, if error rate becomes too high it may be beneficial to transmit data across one or more connections with a reduced error rate than what was previously obtained. In yet other situations, a connection that was previously useful for transmitting data may become unusable, and further use of that connection may not be beneficial. In still other situations, a connection that was not previously used (and/or useful and/or available) for communication may later be useful and/or available—and use of that connection may be desired. In yet other situations, more than one of the above factors (and possibly other factors) may be considered in determining over which connection(s) data should be transmitted.

The above explanations have related to multipath VPN communication (more than one connection possibility). However, aspects of the embodiments set forth above may relate to communication without a VPN. For example, in a non-VPN environment, the above explanations may also relate to whether data is transmitted on bonded or mirrored connections, how data is allocated between multiple connections, and over which connection (or connections) data is transmitted may be subject to one or more conditions (such as speed, error rate, delay, quality, cost, etc.) over each connection.

The above explanations relate to multipath communication, and FIG. 2 illustrates multiple access points, but this is merely exemplary. Aspects of the embodiments set forth above may relate to communication that does not occur in a multipath environment. Alternatively, aspects of the embodiments set forth above may relate to communication in a single path environment (i.e. cellular) followed by subsequent communication in another single path environment (i.e. Wi-Fi). For example, in an environment that is not multipath, it may be advantageous to select the carrier protocol based on or independently of the application protocol in order to achieve faster data communication. As explained above, for example, faster communication may be achieved by transitioning to TCP protocol for both the application protocol and the carrier protocol. Alternatively, in some situations, communication that is more desirable (i.e. reducing delay, jitter, etc.) may be achieved by transitioning to UDP protocol for both the application protocol and the carrier protocol. Alternatively, a combination of TCP and UDP (as a result of one or more transitions) may result in communication that is more desirable. Other combinations of application protocol and carrier protocol may be used in a non-multipath environment in accordance with the various examples and factors set forth above.

Whether or not a VPN is in use (and with or without encryption) in accordance with other exemplary details set forth above, it may be desirable to measure various parameters, and to then adjust over which connections (or the allocation of data over multiple connections) data is transmitted after those parameters are measured. There are numerous technological advantages that are achieved with such an approach.

First, it is advantageous for a computer system to transition between connection choices, or to transition between allocation of data on multiple connections, in a seamless manner. For example, when watching streaming video, it can be highly disruptive to the viewing experience for the user to interact with a communications device to make modifications to the connection choice (i.e., which connection(s) are used for data transmission) and/or data allocation while the viewing experience is in progress. If the user needs to manually change settings during a viewing experience, the experience is interrupted, which impacts the enjoyment of the experience. Furthermore, a user may not be aware of which setting changes would optimize the viewing experience, and/or when to make those changes. It is thus technically advantageous for such transitions to occur automatically and seamlessly.

Second, although not an exclusive issue, there may be technical disadvantages in having a user interact with a computer device in order to measure communication parameters and/or adjust connection choice and/or data allocation. Preferable transitions in some such situations may be delayed waiting for user input. In addition, offering a User Interface (UI) and accepting and processing data input to the UI in order to change how connections are used to transmit data may increase processor overhead. Exemplary embodiments of the present invention provide technological advantages by eliminating these adverse issues.

Third, in some situations, a user may not have access to the visual data and/or the controls that may be needed to interact with a computer device and alter connection choice and/or data allocation. Such situations may occur, for example, during the operation of a motor vehicle, when the user is conducting a conversation using a mobile communications device, and the user cannot take their eyes away from the road to view communication measurements and/or alter connection choice and/or alter data allocation. Thus, there are technological advantages in being able to detect communication issues and/or automatically taking corrective action under the control of a microprocessor.

Figure 3:
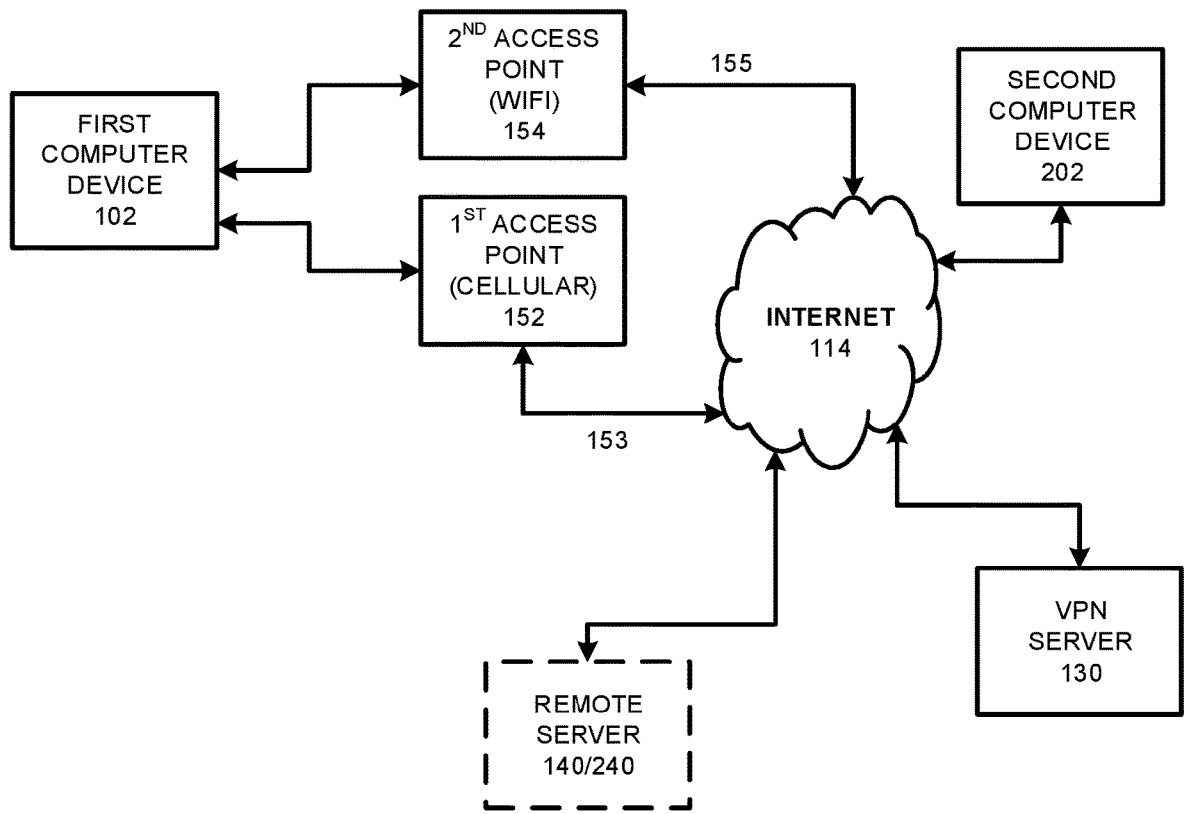
FIG. 3 is a block diagram of a first computer device and a second computer device communicating via multiple access points in accordance with one or more exemplary embodiments of the present invention.

FIG. 3 is a block diagram that illustrates the transmission of encrypted (or encapsulated) data between first computer device 102 and second computer device 202 using one or more access points. In FIG. 3, first computer device 102 transmits encrypted data to Internet 114 via first access point 152 and second (optional) access point 154. Each access point transmits its respective data to Internet 114 via respective channels 153 and 155. Furthermore, each access point may be used for accessing the Internet 114 using a different form of communication, and thus a different protocol. For example, first access point 152 may be cellular. For example, second access point 154 may be Wi-Fi. These forms of communication are merely exemplary as other forms of communication are contemplated. Exemplary further forms of communication include Ethernet and satellite.

FIG. 3 further shows that data transmitted via channels 153 and 155 is received by Internet 114. From Internet 114, the data may be transmitted to VPN server 130. VPN server 130 reassembles the data received via channels 153 and 155 into the order in which it existed prior to being transmitted from first computer device 102. In one embodiment, the VPN server 130 decapsulates/decrypts the received data and then transmits the decrypted data to second computer device 202 via Internet 114. In some embodiments, one or more remote servers 140, 240 may play an intermediate role between VPN server 130 and second computer device 202. In other exemplary embodiments, further VPN servers may be included as illustrated below.

FIG. 3 is included herein in order to illustrate that the various features described regarding FIG. 2 may be included in many different kinds of environments where encapsulation/encryption occurs, such as the environment illustrated with regard to FIG. 3.

Figure 4:
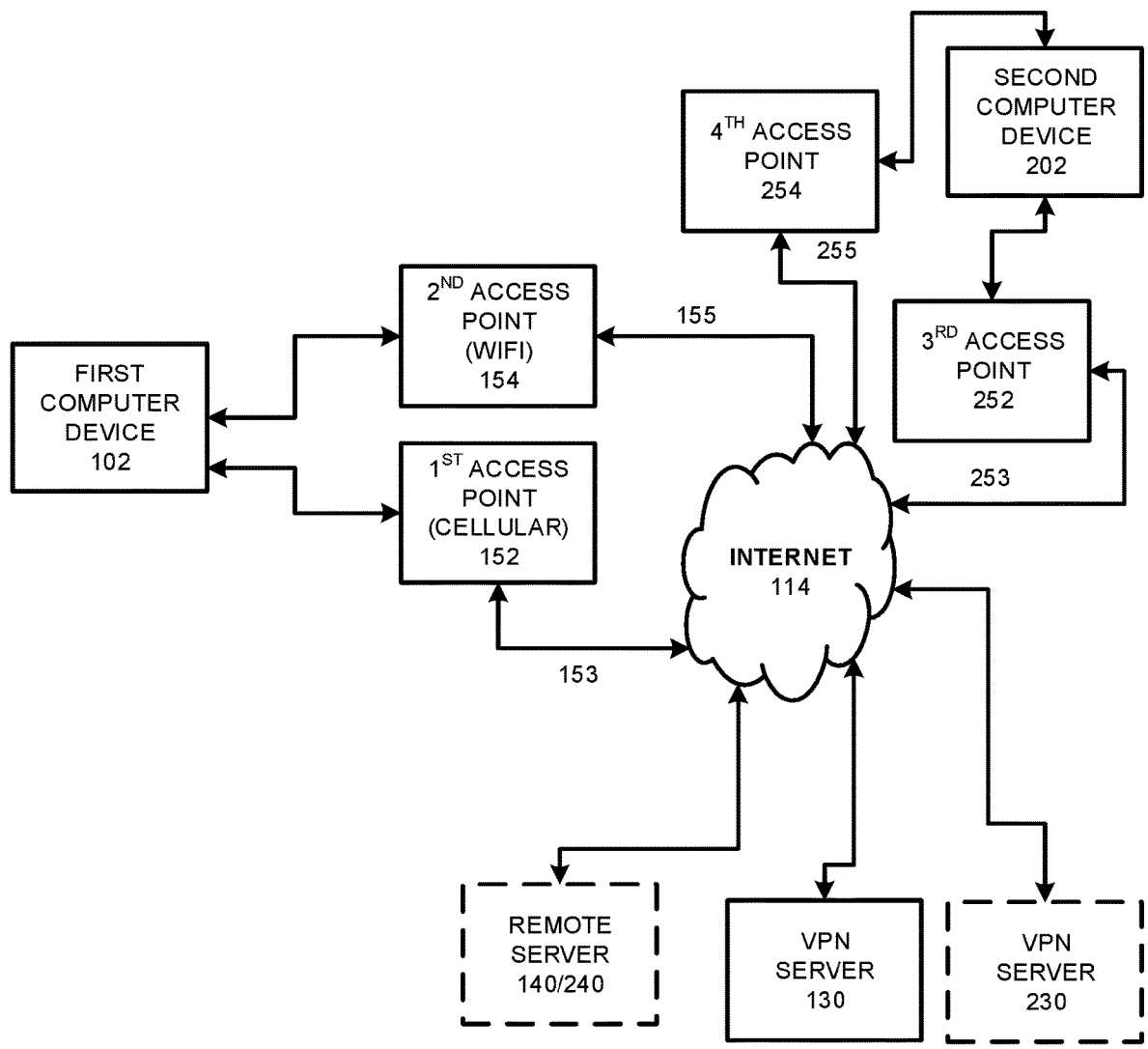
FIG. 4 is a block diagram of a first computer device and a second computer device communicating via multiple access points in accordance with one or more exemplary embodiments of the present invention.

FIG. 4 illustrates a further exemplary embodiment of the present invention in which both first computer device 102 and second computer device 202 use multiple channels in order to improve communication performance. Again, data may be transmitted to Internet 114 via access points 152, 154 and via channels 153 and 155. The exemplary embodiments shown in FIG. 4 differ from the exemplary embodiment shown in FIG. 3 in that multiple access points may be used by a second computer device 202 prior to the data reaching internet 114 (or another WAN). In particular, second computer device 202 communicates with Internet 114 via third access point 252 and fourth access point 254. Third access point 252 is coupled to Internet 114 via channel 253. Fourth access point 254 is coupled to Internet 114 via channel 255. Third access point 252 and fourth access point 254 may be coupled to respectively different communication protocols such as cellular and Wi-Fi, or to the same communication protocol (e.g., two independent Wi-Fi networks). Again, other forms of data transmission may be used, such as satellite, Ethernet, etc.

Third access point 252 and fourth access point 254 can improve data communication in both directions between first computer device 102 and second computer device 202. For example, after leaving Internet 114, data can be transmitted to second computer device 202 via channels 253, 255. Conversely, data can be transmitted from second computer device 202 and to Internet 114 via channels 253, 255. In particular, various embodiments associated with FIG. 4 may include VPN server 230. Prior to VPN server 230 sending data to second computer device 202, VPN server 230 may use both channels 253, 255 for data transmission. Similarly, after second computer device 202 sends data using both channels 253, 255, that data may travel from Internet 114 to VPN server 230. Thus, in several embodiments, VPN server 230 may encrypt data and transmit data over channels 253, 255 before it is received, arranged in proper sequence, and decrypted by second computer device 202. Conversely, second computer device 202 may include a VPN client that schedules data for transmission to third access point 252 and forth access point 254, encapsulates/encrypts the data and then transmits the data so that it travels over channels 253, 255. The data is then received by Internet 114, and is subsequently received by VPN server 230, before the data is placed in proper order, decapsulated/decrypted, and sent downstream towards first computer device 102.

FIG. 4 demonstrates that one or more optional servers 140, 240 may be included. These optional servers may receive data before or after any VPN server receives data.

The above description describes placing data into proper order (the order it existed before being transmitted from a source) and then encrypting/decrypting. It is understood to one of ordinary skill in the art that these two steps may be reversed, i.e., data may be encrypted/decrypted before it is placed in proper order.

FIG. 4 is included herein in order to illustrate that the various features described regarding FIG. 2 may be included in many different kinds of environments where encryption or encapsulation occurs, such as the environment illustrated with regard to FIG. 4.

Figure 5:
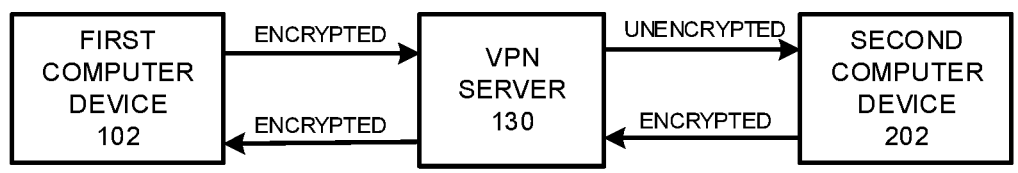
FIG. 5 is a block diagram that illustrates encrypted and unencrypted data between two computer devices in accordance with exemplary embodiments of the present invention.

FIG. 5 illustrates further exemplary embodiments of the present invention regarding whether data is encrypted or unencrypted as it travels between first computer device 102 and second computer device 202. In one embodiment, encryption may only occur between first computer device 102 and VPN server 130. Thus, the data is encrypted prior to leaving first computer device 102 and is decrypted upon arrival at VPN server 130. The data remains unencrypted for its transmission between VPN server 130 and second computer device 202. In other embodiments, data is encrypted for a greater part of its transmission than is described above. For example, data may be encrypted as it travels from first computer device 102 to VPN server 130. Furthermore, data may be encrypted as it travels from VPN server 132 second computer device 202. In some embodiments, VPN server decrypts data upon receipt and then encrypts the data again prior to leaving VPN server 130. In other embodiments, data is encrypted prior to arriving at VPN server 130 and remains with the form of encryption it was encrypted with prior to arriving at VPN server 130. In a further embodiment, a type of "onion router" mechanism is used where data is encrypted prior to arriving at VPN server 130, VPN server 130 creates an additional level of encryption (i.e., no decryption prior to encryption), and thus as a result, data that has been encrypted two or more times leaves VPN server 130 before arriving at second computer device 202. Such data will preferably be decrypted multiple times, for example, by a VPN client associated with second computer device 202.

The above description refers to data flow from first computer device 102 to second computer device 202. It is understood, however, that data may flow from second computer device 202 to first computer device 102 and, for some or all of its transmission between the two computer devices data, may be in encrypted form. In alternative embodiments, a VPN server provides an additional level of encryption. The additional level of encryption is removed at a later time, for example, by a VPN client associated with second computer device 202 that is able to decrypt multiple levels of encryption. In yet further embodiments, VPN server 130 neither performs encryption nor decryption. Thus, the data encrypted by first computer device 102 flows through VPN server 130, and the encryption performed by first computer device 102 is decrypted by a VPN client associated with second computer device 202.

FIG. 5 is included herein in order to illustrate that the various features described regarding FIG. 2 may be included in many different kinds of environments where encryption or encapsulation occurs, such as the environment illustrated with regard to FIG. 5. The instances of encryption, decryption, encryption over encryption (onion encryption), etc., may vary depending on the circumstances of the end devices and the supporting network (e.g., VPN server).

Figure 6:
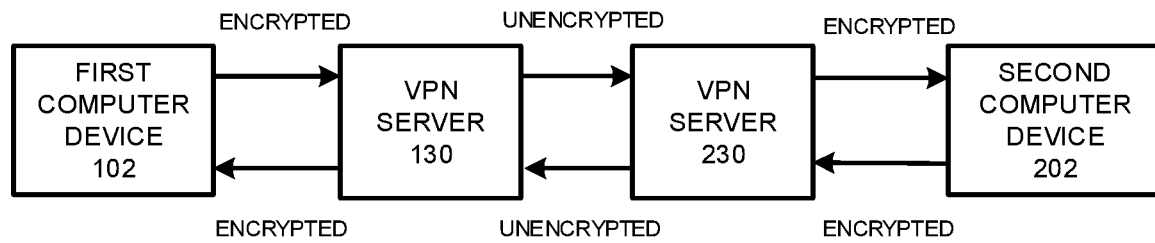
FIG. 6 is a block diagram that illustrates encrypted and unencrypted data between two computer devices in accordance with exemplary embodiments of the present invention.

FIG. 6 illustrates further exemplary embodiments of the present invention. As shown, data traveling between first computer device 102 and VPN server 130 is encrypted. Furthermore, data traveling between second computer device 202 and VPN server 230 is encrypted. If VPN server 130 decrypts data received from first computer device 102, then data transmitted from VPN server 130 to VPN server 230 is unencrypted. If VPN server 230 decrypts data received from second computer device 202, data transmitted from VPN server 230 to VPN server 130 is unencrypted. In further exemplary embodiments of the present invention, data may be encrypted for a greater amount of its transmission between first computer device 102 and second computer device 202 than is described in the embodiments above. For example, VPN server 130 can decrypt and subsequently encrypt data it receives. Encrypted data is subsequently transmitted to VPN server 230, where it may be decrypted and subsequently encrypted. Encrypted data may subsequently be transmitted to second computer device 202. The process may work similarly in reverse. Alternatively, VPN server 130 may provide an additional level of encryption and VPN server 230 may either decrypt that additional level of encryption or simply allow the encrypted data to be retransmitted to second computer device 202. Second computer device 202 may then include a VPN client that can decrypt one or more levels of encryption. In further embodiments, neither VPN server 130 nor VPN server 230 perform encryption. Thus, the encryption performed by first computer device 102 is removed by VPN client associated with second computer device 202. Communication in the exemplary embodiments may be accomplished between source and destination in a single path manner or a multipath manner (or some combination thereof).

In the above embodiments, it is understood that encryption and/or decryption may occur at one, some, or all stages of the transmission between first computer device 102 and second computer device 202. Some servers may perform encryption, some servers may perform decryption, some servers may perform both, some servers may perform neither. Some servers or clients may perform multiple levels of encryption. Some forms of servers or clients may perform multiple levels of decryption. The various combinations of encryption/decryption may occur for data transmitted from first computer device 102 to second computer device 202, and for data transmitted from second computer device 202 to first computer device 102. For example, the data sent from 102 to 202 may be unencrypted by one VPN server 130/230 and encrypted by another of VPN servers 130/230. Similarly, data sent from 202 to 102 may be encrypted the entire route or may undergo a decryption and encryption by the VPNs 130/230 along the data routing process.

FIG. 6 is included herein in order to illustrate that the various features described regarding FIG. 2 may be included in many different kinds of environments where encryption or encapsulation occurs, such as the environment illustrated with regard to FIG. 6.

The above explanations have included the use of one or more channels between a computer device and the wide area network such as the Internet. By providing two or more channels, various advantages may be obtained. This is further described below.

Figure 7:
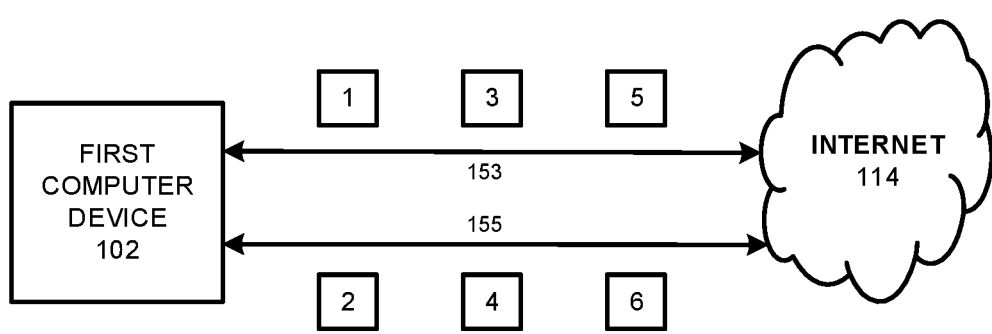
FIG. 7 is a block diagram that illustrates parallel bonded transmission of packets in a multipath environment in accordance with exemplary embodiments of the present invention.

FIG. 7 illustrates the use of channel bonding in order to increase transmission bandwidth. In the example shown in FIG. 7, two channels are used to transmit data between first computer device 102 and Internet 114. In the example shown, first computer device 102 may attempt to transmit six packets, labeled as packets 1 through 6, to Internet 114. FIG. 7 illustrates that some packets are transmitted on channel 153 while other packets are transmitted on channel 155. In particular, packets 1, 3 and 5 are transmitted on channel 153 while packets 2, 4 and 6 are transmitted on channel 155. In this manner, packets are received by Internet 114 faster than if packets had been transmitted to Internet 114 on only one channel. How much faster packets are received in a multichannel environment (versus a single channel environment) is dependent on the speed and latency of one channel compared to the speed and latency of a second (or more) channel.

While FIG. 7 demonstrates that the packets are evenly distributed and interspersed between the two channels, this is merely exemplary as packets may be dominating one channel and using another less frequently or for mere control information transfer only. For various reasons, there may be more packets being transmitted on one channel than on another channel (for example, if one channel has better signal strength than another channel). In another embodiment, the sequence of packets being transmitted may be different than what is illustrated in FIG. 7. For example, packets 1, 2 and 3 may be transmitted on channel 153 while packets 4, 5 and 6 may be transmitted on channel 155. Furthermore, while two channels are shown in FIG. 7, this is merely exemplary as there may be more than two channels. Other examples of channel bonding are known. For example, channels may be added or subtracted as respective signal strength (and/or error rate) on some channels increases or decreases. One or more channels may be available, but may not be used, and may thus be reserved for later use. Also, the percentage of total data flowing over each channel may be dynamic and change subject to changing channel conditions. In one embodiment, more than 50% of packets are transmitted on one channel. In one embodiment, initially more than 50% (for example 100%) of packets are transmitted on the one channel, and then allocation of packets is adjusted so that fewer packets are transmitted on the one channel, and more packets are transmitted on another channel. The transmission on the multiple channels may also be simultaneous or in parallel with respect to one channel and one or more additional channels so that packets are transferred on at least two channels at the same time.

Figure 8:
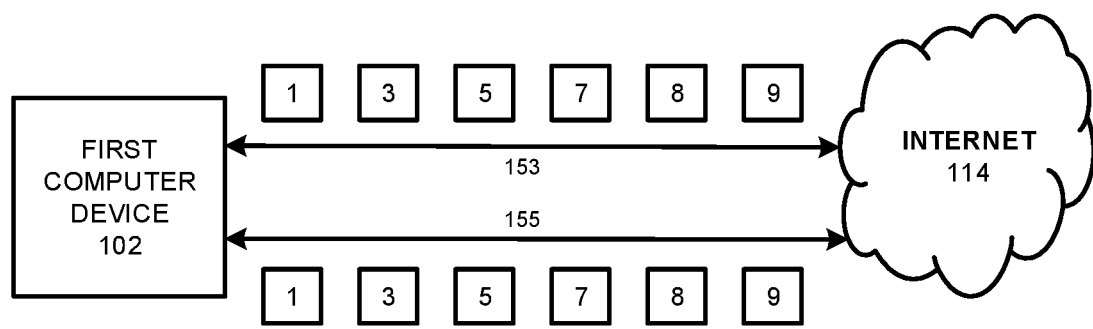
FIG. 8 is a block diagram that illustrates parallel mirrored transmission of packets in a multipath environment in accordance with exemplary embodiments of the present invention.

FIG. 8 is an example of channel mirroring. In this example, the same packets may be transmitted over two separate channels 153, 155. In some examples, data transmission may begin using the (channel) bonded method shown in FIG. 7. If the packets transmitted over channel 2, 4, and 6 are received at a destination, but one or more of the packets transmitted over channel 153 are not received at a destination, then it may be assumed that channel 153 has problems or channel deficiencies (e.g., noise, signal strength, etc.) that affect the ability to receive the packets at a recipient device when transmitted by first computer device 102. In such a scenario, transmission may switch from a bonded transmission method to a mirrored transmission method. In other words, assume again that packets 1, 3 and 5 are not received at their destination. One possibility is that first computer device 102 has not received acknowledgment (ACK) that packets 1, 3 and 5 have been received at their destination. Another possibility is that first computer device 102 receives a signal from the destination (or some point in between) indicating either that packets 1, 3 and 5 have not been received, or that packets 1, 3 and 5 have been received with errors. Subsequently, first computer device 102 may attempt to re-transmit the missed packets or the group of packets which include the missed packets via the same approach on the same channel (i.e., bonded connections) and/or over multiple channels in a different channel transmission method, such as a mirrored transmission where the missing packets or group of packets are retransmitted on multiple channels at the same time or in succession. In this example, the first computer device 102 may re-transmits packets 1, 3, and 5 on both channels 153 and 155. After retransmitting those packets, first computer device 102 may subsequently begin transmitting all packets on multiple channels (i.e., packets 7, 8 and 9). In other words, because it is known that there is some sort of problem transmitting packets over channel 153, transmission subsequently occurs in a mode, such as mirrored mode so that all packets are transmitted redundantly, i.e., across multiple channels as illustrated in FIG. 8. The decision to change from channel bonding to channel mirroring and stay in the channel mirroring mode of operation may be based on a period of time, such as 1, 2, 5 minutes of time before channel bonding is re-introduced.

Thus, in the above example of FIGS. 7 and 8, data transmission initially occurred using channel bonding, in order to obtain greater bandwidth. Subsequently, it was determined that one of the channels being used for bonded transmission is suffering from transmission problems. As a result, transmission or re-transmission switches to a mode in which data transmission is mirrored, i.e., packets are transmitted redundantly on two or more channels to ensure that all packets are received, despite the fact that a channel is incurring transmission problems.

In the manner described above, first computer device 102 is initially trying to transmit data using a higher bandwidth (using channel bonding), with the assumption that a higher bandwidth is available. If that higher bandwidth is not available or is not being reached while maintaining channel integrity, then first computer device 102 switches to a mirrored mode, with redundant packet transmission on multiple channels, to ensure that all packets are received. First computer device 102 thus attempts to transmit using channel bonding with the expectation that higher bandwidth available. If higher bandwidth is not available, then first computer device 102 transmits with lower error rate.

Regarding the above exemplary embodiments, it is also possible that a combination of channel bonding and channel mirroring may occur. Thus, identical packets may be transmitted on channel A and channel B, and further packets may be transmitted on channel A that are not transmitted on channel B. In this example, a group of packets may be sent on one channel, another group of packets will be sent on another channel, a further group of packets may be sent on both channels and the packets in all the various groups are different.

Figure 10:
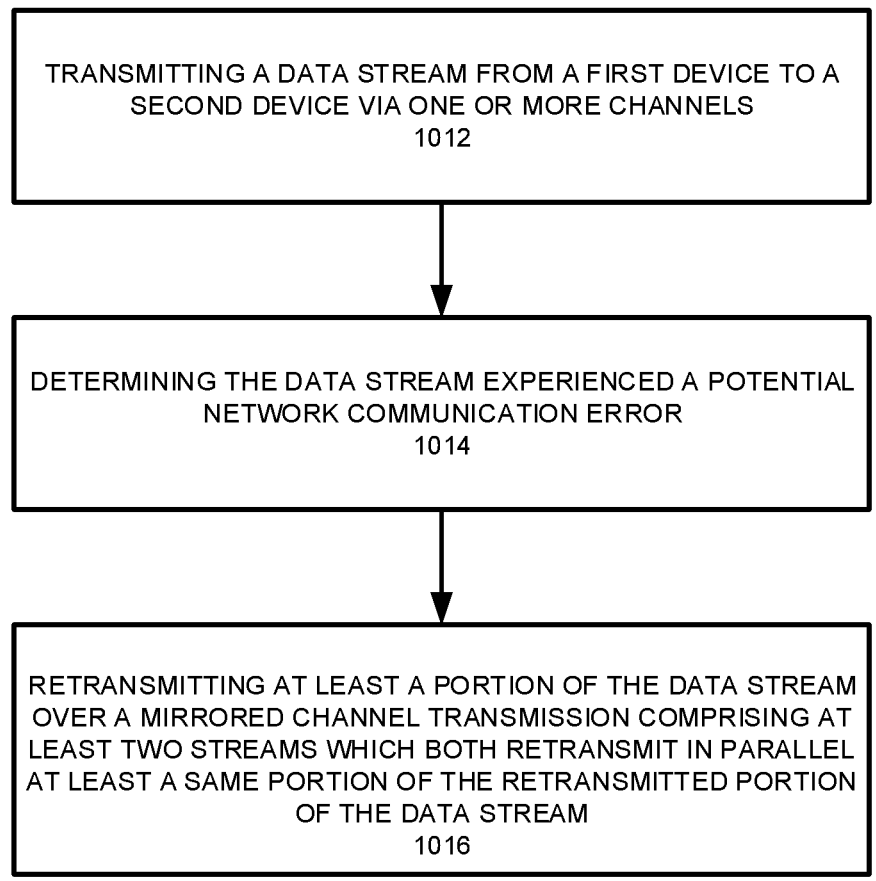
FIG. 10 illustrates a flow chart of an example process of a network communication error retransmission process according to exemplary embodiment of the present invention.

FIG. 10 illustrates an example process of a network communication error retransmission process. Referring to FIG. 10, the process includes transmitting a data stream from a first device to a second device via one or more channels 1012. The number of channels may be one, two or more channels which may be TCP connection type channels or a combination of TCP, UDP or other packet protocol types. The data sent to and received between the first device and the second device may be a number of packets which are either sent as an alternating packet flow over multiple channels, such that each channel sends different packets (channel bonding), or the packets are sent in a redundant manner (channel mirroring) that includes the same packets being sent on multiple channels. Channel mirroring provides redundancy, however, overall throughput over time is lower than if all the packets are unique and sent over multiple channels to provide an overall faster exchange of data between two devices.

Switching between channel bonding and channel mirroring may be a process where the logic used to make a decision to switch from one mode to the other is performed based on common network considerations such as bandwidth throughout, error detection (lost packets), latency and/or jitter. Other factors may play a role in which mode to use at any particular time, such as the type of data, the purpose of sending the data, control data (network control information) vs. payload data (actual data intended to be transferred), priority of one or more of the communication entities, etc. One approach may be to switch from the optimal channel bonding approach to channel mirroring when a condition occurs, such as a slowed connection and/or lost packets. The decision to switch to mirroring may be based on a hysteresis factor that prevents toggling back and forth between mirroring and bonding. For example, once mirroring is performed, the mirroring mode of packet transfer over multiple channels may be performed for a period of time and/or until that session has ended. In another example, mirroring may be reserved for a subset of data requiring transmission that is deemed higher priority, while continuing to transmit other lower priority data as a bonded transmission. High priority data can be identified with rules based on IP addresses, ports, protocols, domains, URLs, packet sizes, packet rates, or other traffic pattern characteristics. For example, data sent on one part, such as TCP port 1935, can be identified as a stream of real-time messaging protocol (RTMP) data that should be prioritized above other data. That port may be identified and stored as a higher profile prioritized port number identified by a flag or other formal designation which can be readily identified and applied when selecting a channel transmission mode of operation.

Continuing with the same process, other operations may include determining the data stream experienced a potential network communication error or condition 1014, and retransmitting at least a portion of the data stream over a mirrored channel transmission that includes at least two streams which both retransmit in parallel at least a same portion of the retransmitted portion of the data stream 1016. In this example, the mirroring mode of operation will generally transfer some same packets on more than one channel for redundancy. However, this approach may also include switching to a partial redundancy strategy where only a portion of all the packets (i.e., 25, 50, 75 percent) of the packets are sent as duplicates, however, the amount/percentage of redundant packets could be increased or decreased depending on the measured success rate of the data transfer(s) over a period of time.

Prior to the detected error condition, the process may include transmitting the data stream from the first device to the second device by bifurcating the data stream into a first data stream portion and a second data stream portion so that some data is transmitted as the first data stream portion over a first bonded channel of a bonded channel transmission, and the second data stream portion of the data is transmitted over a second bonded channel of the bonded channel transmission. The process may also include determining the data stream experienced a potential network communication error by determining one or more of the first data stream portion and the second data stream portion experienced a potential network communication error. In general, the first data stream portion and the second data stream portion are transmitted in parallel (i.e., at the same time) over the first bonded channel and the second bonded channel in a same time interval, and the first data stream portion and the second data stream portion together comprise the data stream.

The first bonded channel may be a WIFI connection type or a cellular data connection type and the second bonded channel may be the opposite type of the first bonded channel type. The process may also include maintaining the mirrored channel for subsequent transmissions for one or more of a period of time and a number of transmissions without additional potential network communication errors being identified, and the mirrored channel transmission may include at least two identical data streams being transmitted in parallel. The process may also include transmitting a subsequent transmission as a single data stream or as a multi-stream channel bonded stream after one or more of the period of time and the number of transmissions have occurred without additional potential network communication errors. The potential network communication error may include one or more of jitter, latency, packet loss and bandwidth degradation. The retransmitting at least a portion of the data stream over the mirrored channel transmission may also include transmitting a larger number of data stream packets over a first channel and a lesser number of data stream packets over a second channel so that one channel is being used to transfer more data packets over a period of time. The lesser number of data stream packets may each be duplicated and included with the larger number of the data stream packets. For example, if 25 percent of the packets are transferred over a second channel and 75 percent are transferred over a first channel, then the 25 percent of packets may also be mirrored for added redundancy and thus those 25 percent of the packets may instead be transferred over both channels. The remaining 75 percent of the packets may continue to be transferred over a single connection or both connections if moved to a bonded channel mode of operation. The 25 percent of packets may belong to a different category of data, such as control data, a different application, real-time audio and/or real-time video, etc.

In another example embodiment, the number of channels used, the use of channel bonding and/or channel mirroring as a mode of communication among the channels being used, and whether to transmit or receive data between the first computer device 102 and the second computer device 202 based on one or more of the aforementioned strategies, may include other factors. For example, channels between the computer devices may be operating one or more applications with one or more types of data, protocols and/or requirements. Real time applications, such as voice calls, video calls, or online games, can be sensitive to delays and network errors. The user directly interacts with these types of applications and can be interrupted by poor network performance, so data from real time applications can be considered high priority. Most other types of applications, such as web browsing, email, or downloading updates in the background are more tolerant of network delays or occasional errors. A user might not notice if emails take a few extra seconds to load, for example. High priority application data can be identified with rules based on IP addresses, ports, protocols, domains, URLs, packet sizes, packet rates, or other traffic pattern characteristics. Real time audio and video applications usually send data with a fixed packet size at a consistent rate to correspond with the bitrate of the audio or video communication. Some services use well known ports or protocols, such as TCP port 1935 for RTMP traffic.

The traffic pattern characteristics and other characteristics can be used to identify high priority real time traffic. When there is data waiting to be transmitted from multiple applications simultaneously, data from higher priority applications will be transmitted first before other lower priority applications. When considering using bonded channel communication, some of the channels may be more expensive or be subject to certain limitations than the other channels. For example, a cellular connection with a data cap limit can stop working or charge high fees when the data limit is exceeded. In these cases, bonding of the more expensive network can be reserved for high priority traffic while other traffic is only transmitted on one or more lower cost networks. Similarly, when a potential network communication error occurs, channel mirroring may be reserved for only high priority data that needs the extra reliability while other data continues to transmit with the bonded mode.

Another example embodiment may include a process for tracking application use over one or more channels to identify ways to optimize channel usage especially when network degradation and unexpected data transfer errors occur. The process may include identifying data traffic being transmitted and received over bonded communication channels, such as two or more channels and in a mode of operation that includes both channels being used for some or all of the application data. The process may also include detecting one or more data traffic error conditions over one or more of the bonded communication channels, determining one or more of the applications transmitting and receiving data over the bonded channels has a lower priority than at least one other higher priority application of the applications, and modifying the data transfer mode used to perform one or more alternative approaches. For example, one alternative approach may include transmitting fewer data packets associated with the lower priority application over the bonded communication channels than compared to a number of packets transmitted by the higher priority application over a same time period. This approach ensures that the higher priority application(s) has a broader access to the channels than the lower priority application(s). The result may not be that the higher priority application actually transmits more data even though it may be configured to utilize more of the channels' combined capacity than the lower priority applications.

Another approach when an error condition occurs, such as latency, bandwidth reduction, lost packets, etc., may provide transmitting data packets associated with the higher priority application in a mirrored packet transmission mode over multiple ones of the bonded communication channels. The packets associated with the higher priority application may be identified by size, type, port, destination, protocol, etc., and granted a higher priority status which may include using mirroring on both or all channels so that the same packets or certain packets are transmitted more than once (i.e., duplicated). Once a network error is detected, the traffic for the higher priority application(s) may initiate mirroring on two channels or more than two channels. The other traffic for other applications may stay the same, and could be paused or queued until a data transfer is ready to be performed over the available channels.

In one example, one channel may be a WIFI data medium, and another channel may be a cellular data medium. The cellular channel may be a bonded second channel dedicated for voice/video, etc., and may wait for the higher priority applications only, or the secondary priority applications only, or a combination of both, or a weighted combination where the higher level applications are permitted to use more data channel capacity or more time on the channel for data transfers. Priority of the applications could be identified by a flag, an application file name and/or other rules which are used to identify the applications which are higher priority, or which may be identifiable by an operating system specific auditing approach, such as, protocols, data rate, or other attributes of the application which are audited and used as the basis to identify higher priority applications and which require data exchanged faster or first or over multiple channels.

Figure 11A:
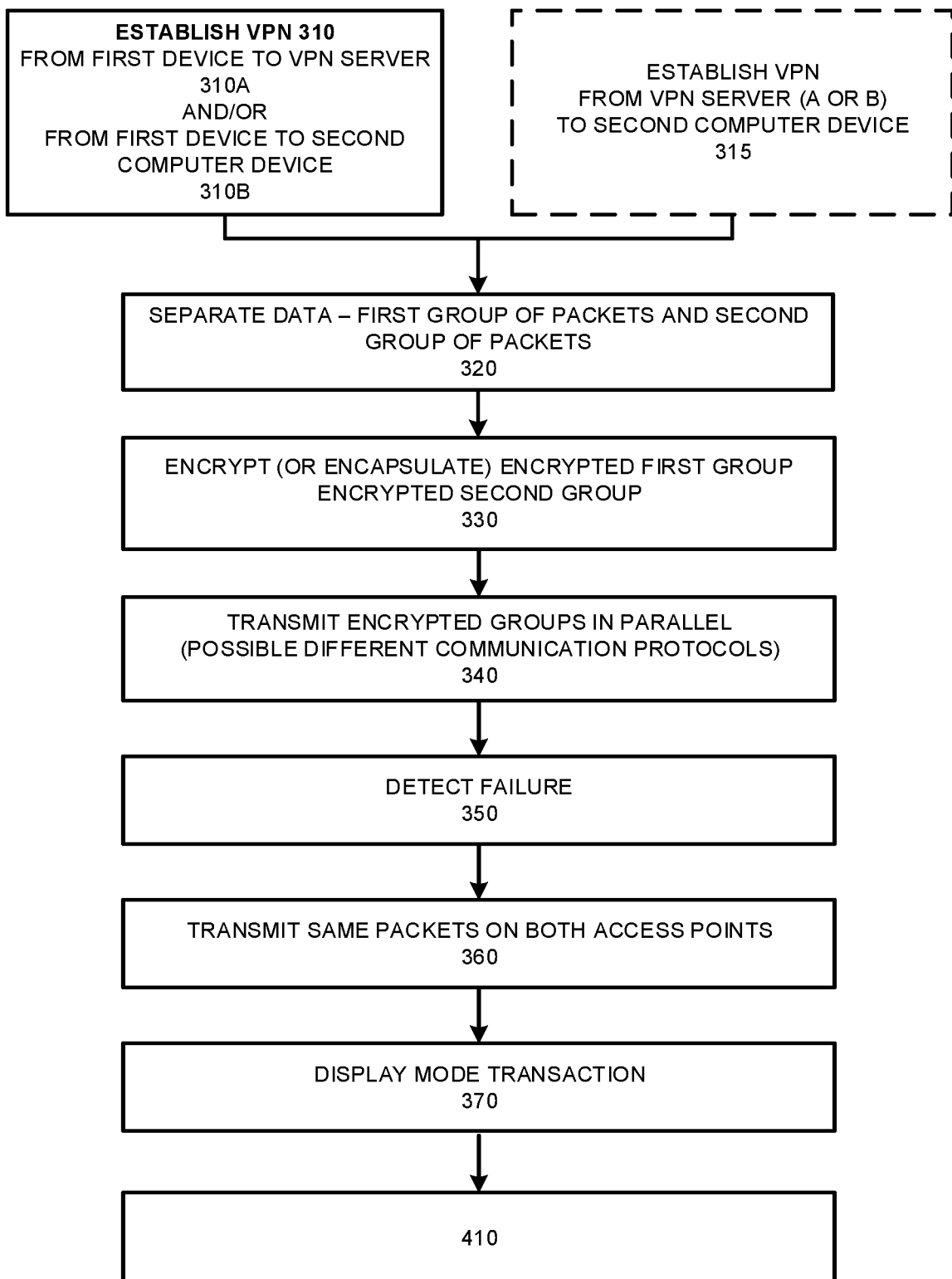
FIG. 11A is a flow chart diagram that illustrates transmission of packets within a VPN according to exemplary embodiments of the present invention.

FIG. 11A is a flowchart diagram that illustrates operation of one or more exemplary embodiments of the present invention. At step 310, a VPN is established. As illustrated in FIG. 5, a VPN may be established across less than all of the connections between first computer device 102 and second computer device 202. As alternatively shown in FIG. 5, a VPN may be established that extends from first computer device 102 to second computer device 202. Optional step 310a refers to a VPN that is established from a first computer device to a VPN server. Optional step 310b refers to a single VPN that is established from a first computer device to a second computer device.

Alternatively, and optionally, as indicated in step 315, while one VPN may be established that includes first computer device 102, a second VPN may be established that extends from (i.e., is associated with) second computer device 202.

At step 320, data that will be transmitted over a VPN is separated into more than one group. For example, the data can be separated into a first group of packets, and the data can be separated into a second group of packets. The first group of packets and the second group of packets may be subsequently transmitted over separate channels. This is illustrated, for example, in FIG. 7 in which packets have been separated into two groups, and the first group with packets 1, 3 and 5 is transmitted over channel 153 while the second group of packets comprising packets 2, 4 and 6 is transmitted over channel 155.

At step 330, the packets in each group are encrypted. Alternatively, packets may be encapsulated without being encrypted. In other words, at this step, the encryption that results in data being transmitted over a VPN may occur. Thus, the packets in the first group may be encrypted and the packets that are included in the second group may be encrypted. Note that encryption can occur for each packet either before it is assigned to a group or after it is assigned to a group.

At step 340, the packets from the two groups are transmitted in parallel (e.g., simultaneously). An example of such a transmission is shown in FIG. 7 (in which bonded channel communication is illustrated). Note that packets 1, 3 and 5 are transmitted on channel 153 while packets 2, 4 and 6 are transmitted on channel 155. Note that any two packets do not need to be transmitted at exactly the same time. Rather, by being transmitted in parallel, the total bandwidth available for transmission of the packets has substantially increased as a combination of bandwidth over two or more channels.

At step 340 it is noted that when the groups of packets are transmitted on two different channels, the channels may have respectively different communication protocols and/or data communication mediums. Exemplary protocols and/or mediums include cellular, Wi-Fi, satellite, ethernet, etc. In other embodiments, the two channels may use the same protocols and/or mediums (e.g., both channels may be Wi-Fi). In one example, the same medium may be used on two separate channels, but the protocols may be different.

At step 350 a failure is detected. Failure may mean that one or more of the packets transmitted on channel 153 are not received (or are received with errors) by a destination (or intermediate destination). Detection of failure can take several forms. Failure can be detected, for example, when packet '1' is transmitted but no acknowledgment is received that packet '1' has been successfully received. Failure can be detected, for example, when packet '1' is transmitted but an error message is received indicating that packet '1' was not received successfully (e.g., not received at all, received with errors, not received in a timely manner, etc.). At step 360, packet transmission transitions from bonded channel mode to mirrored channel mode. In particular, packet transmission transitions from different packets transmitted on respective access points, to the same packets transmitted on both access points (the access points corresponding to the respectively different channels). This step may occur after the detection of failure occurs in step 350. Step 360 is illustrated with reference to FIG. 8 in which packets that were not successfully received at their destination (or intermediate destination) are retransmitted. Assume, for example, that packet transmission occurs as illustrated in FIG. 7, but one or more packets were not successfully received after being transmitted on channel 153. In response, one or more of the packets that were not received are retransmitted on channel 153 and are further transmitted on channel 155 (as illustrated in FIG. 8). Again, in the example of FIG. 7, one or more of packets 1, 3 and 5 were not successfully received at their destination (or intermediate destination). In response, in the example of FIG. 8, one or more of packets 1, 3 and 5 are transmitted on both channel 153 and channel 155. Furthermore, as shown in FIG. 8, the mirroring that has been initiated as a result of the error (or failure) continues. Thus, as packets 7, 8 and 9 are transmitted on channel 153, packets 7, 8 and 9 are also transmitted on channel 155.

Figure 9:
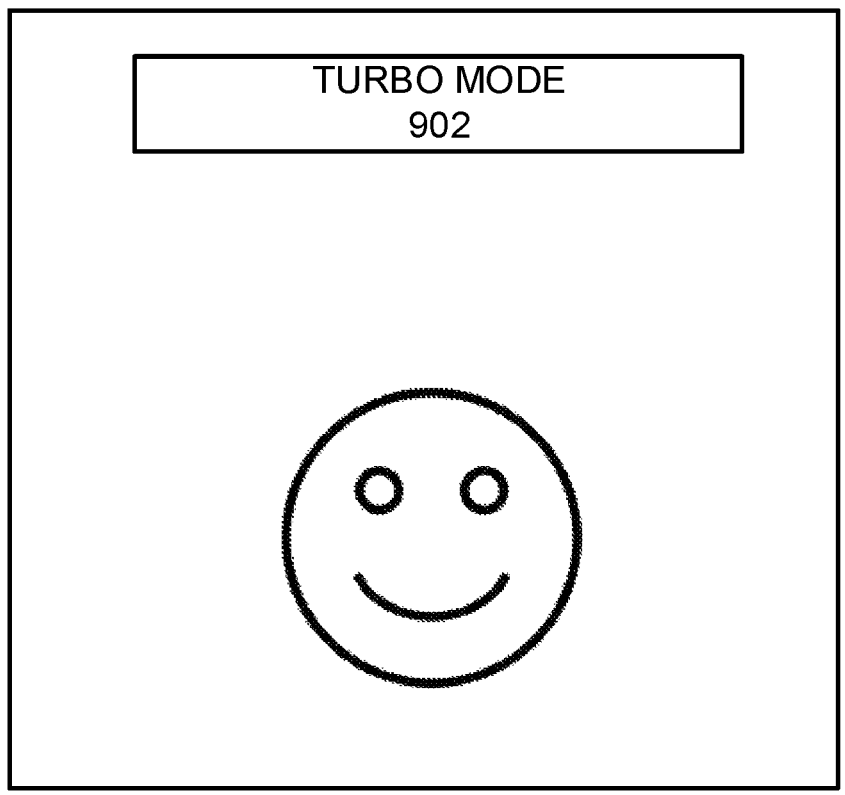
FIG. 9 illustrates exemplary screen shots that may appear in respective transmission modes in accordance with exemplary embodiments of the present invention.
Figure 9:
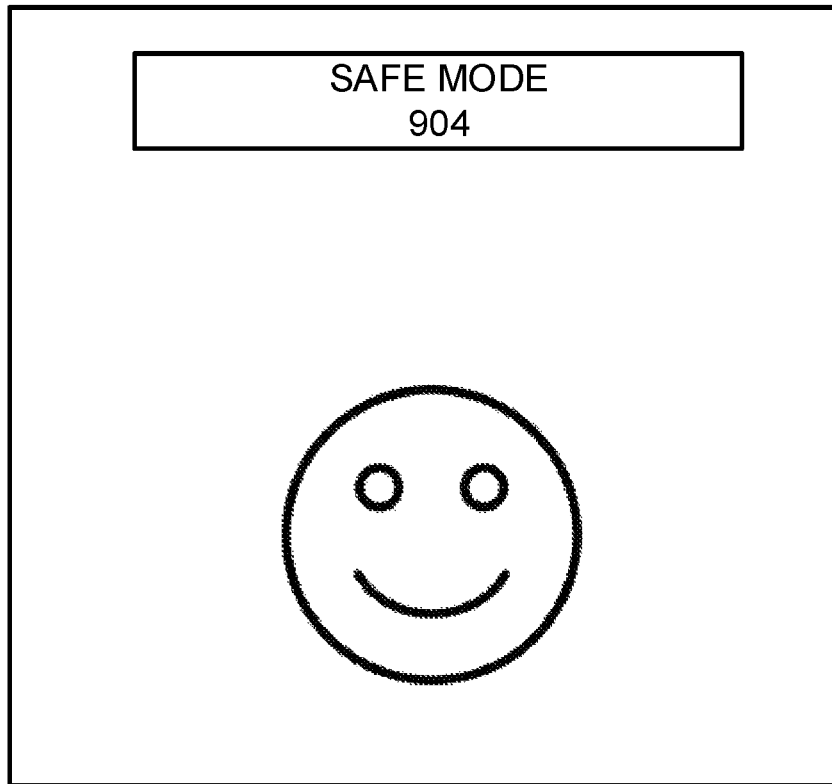

Thus, at step 360, multipath data transmission within the VPN has transitioned from a bonded mode ("turbo" mode, or greater bandwidth mode) to a mirrored mode ("safe" mode, lower error rate mode, lower bandwidth mode, etc.). Operation of step 370 is illustrated in the display interface illustrated in FIG. 9. In FIG. 9, assume that a video conference call is occurring. As shown, an image of a remote individual appears on a user screen. Furthermore, the user screen indicates that communication on the VPN (between first computer device 102 and Internet 114) is occurring in turbo mode 902, i.e., it is a bonded channel connection. If, however, at one point during the videoconference data transmission transitions from bonded channel communication to mirrored channel communication, the display as shown in FIG. 9 transitions to displaying a message such as "safe mode" 904 to indicate to a user that communication is now in a mirrored channel mode. The process continues at operation 410 in FIG. 11B.

Note also, that the display in FIG. 9 may indicate that the above-described transition has automatically occurred. Alternatively, a user may be advised that a transition is preferable, the user permits the transition to occur, and the display of FIG. 9 appears to show that the transition has taken place.

Alternatively, at step 370, and/or in addition, statistics relevant to the communication (delay, error, jitter, etc.) may be displayed.

As explained above, in some embodiments, there may be more than one VPN operating between a data source and a data destination. Both VPNs can be operating in the same mode or both VPNs can be operating in different modes. For example, referring to FIG. 6, the VPN between first computer device 102 and VPN server 130 may be operating in a bonded mode while the VPN between second computer device 202 and VPN server 230 may also be operating in a bonded mode. Alternatively, one of the two VPNs may be operating in a bonded mode while the other of the two VPNs is operating in a mirrored mode. Alternatively, both of the VPNs may be operating in a mirrored mode. A mode where data is both mirrored and bonded is also possible. Each VPN may endeavor to operate in a bonded mode in order to achieve greater bandwidth during communication. However, when errors, delays, or failure occurs, either or both VPNs can transition to a mirrored mode in order to reduce transmission error. At a subsequent time, a VPN that is in mirrored mode can attempt to transition to bonded mode in order to increase bandwidth. If the transition is successful, the VPN can remain in bonded mode. If the transition is not successful, then the VPN can transition back to mirrored mode. Each VPN may have a criteria based on which each VPN attempts to transition between mirrored mode and bonded mode (one way or the other). The criteria may be, for example, after a predetermined period of time has elapsed. In a further example, before transitioning to a bonded mode, a VPN can send a few test packets on a channel to determine whether the test packets are successfully received at its destination.

Figure 11B:
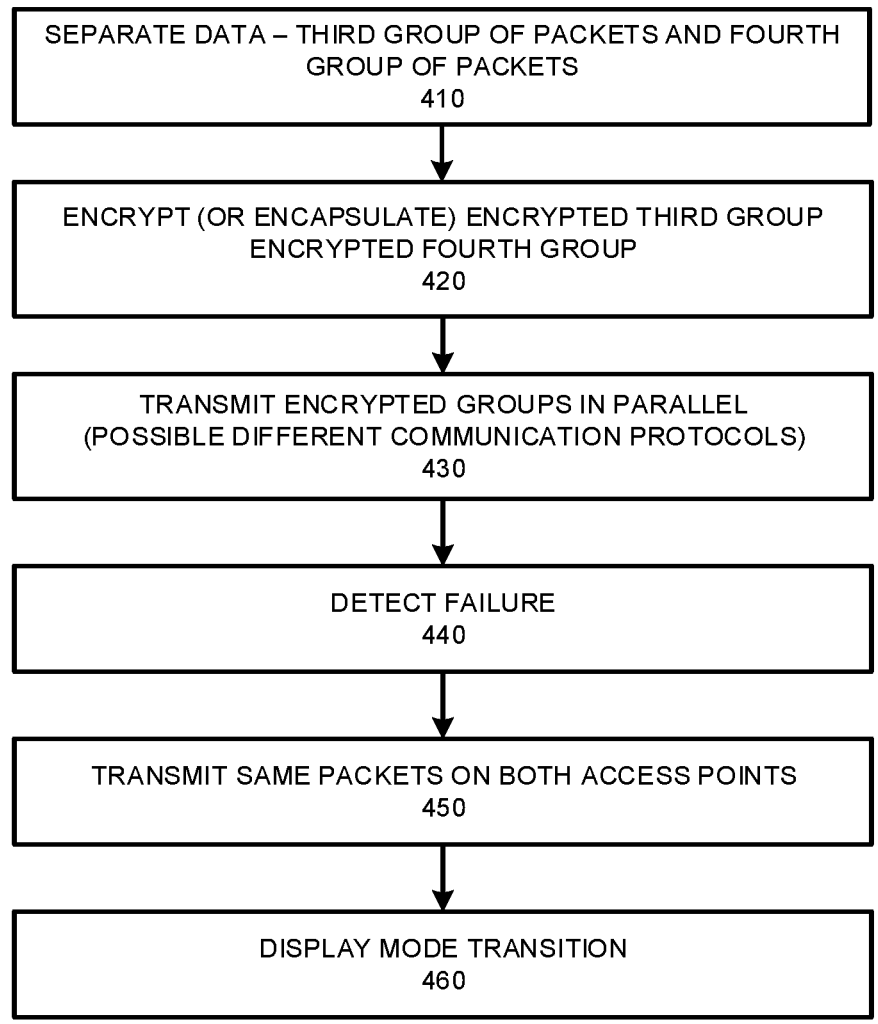
FIG. 11B is a flow chart diagram that illustrates transmission of packets within a VPN according to exemplary embodiments of the present invention.

If communication between two computer devices is being handled by two multipath VPNs, processing may continue to FIG. 11B by off-page connector A.

FIG. 11B is a flowchart diagram that illustrates optional steps that may be performed according to one or more exemplary embodiments of the present invention. Referring to FIG. 6, second computer device 202 transmits data to first computer device 102 after receiving data from first computer device 102. At step 410, second computer device 202 separates data into packet groups. Thus, a third group of packets is formed, and a fourth group of packets is formed. At step 420, the packets in each group are encrypted. Note, that encryption can occur before each packet is assigned to a group or after each packet is assigned to a group. At step 430, the third group of packets and the fourth group of packets are transmitted simultaneously from second computer device 202 to VPN server 230. What is meant by 'transmitted simultaneously' is that there are two or more channels available for packet transmission, and the packets in the two groups are transmitted over separate channels at the same time in parallel in order to increase bandwidth.

At step 440, failure is detected. Failure is the result of one or more packets transmitted by second computer device 202 not being successfully received (e.g. errors, delay, not at all) by first computer device 102. The failure may have occurred at the destination or at an intermediate location. Failure can be detected in a number of ways. For example, the failure may be detected by second computer device receiving an error message stating that one or more packets was not received (or was received with errors) at its destination (or an intermediate destination). Another form of failure can be detected when no acknowledgment is received as to whether or not one or more packets are successfully received at a destination (or an intermediate destination). At step 450, if transmission on bonded channels results in a failure to successfully receive one or more packets, second computer device 202 transitions from transmitting packets in a bonded channel mode to transmitting packets in a mirrored mode. This step is similar to the steps that are illustrated in FIG. 7 and FIG. 8, the difference being that instead of packets being transmitted from first computer device 102 to Internet 114, what instead is occurring is that packets are being transmitted from second computer device 202 to Internet 114.

At step 460, the fact that the multipath VPN associated with second computer device 202 has transitioned from bonded transmission to mirrored transmission is displayed. Alternatively, and/or in addition, statistics relevant to the communication and/or the transition (delay, error, jitter, etc.) may be displayed. Such a display may occur, for example, as shown in FIG. 9. Again, this display can appear automatically as a result of automated transitions, or after a user manually permits transition (after seeing statistics indicative of an adverse condition, being advised that transition is preferable, etc.).

In the previous embodiment, the illustration shown in FIG. 9 displayed information relating to the mode in which the VPN associated with first computer device 102 operates. It is, however, possible to also display information (mode or statistics) regarding the mode in which the VPN associated with second computer device 202 is operating. This is more clearly illustrated in FIG. 12.

Figure 12:
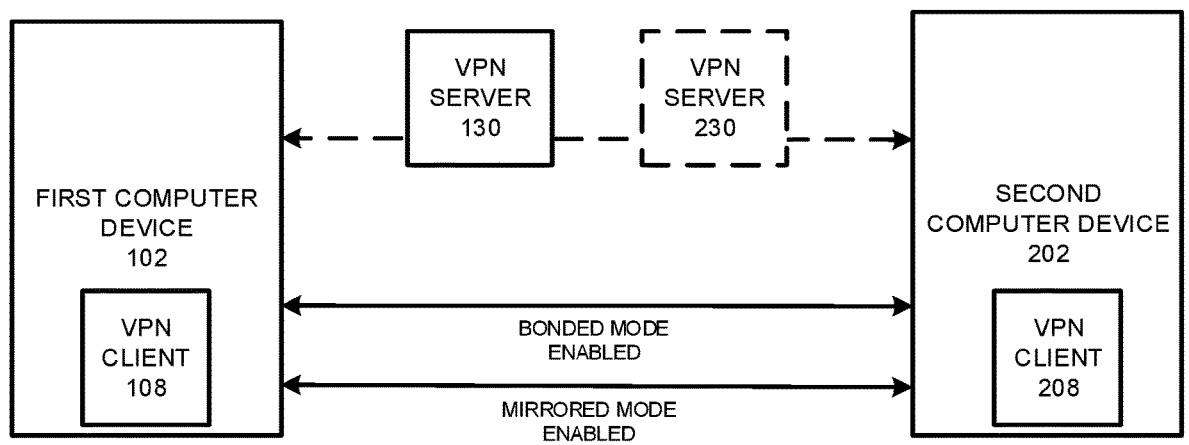
FIG. 12 is a block diagram that illustrates the alternative use of bonded and mirrored transmission in accordance with exemplary embodiments of the present invention.

FIG. 12 illustrates that first computer device 102 and second computer device 208 are communicating with each other by one or more VPNs. In other words, one VPN is associated with VPN client 108 while another VPN is associated with VPN client 208. In the above example, VPN client 208 is communicating with optional VPN server 230 while VPN client 108 is communicating with VPN server 130. In a further embodiment, VPN server 230 is omitted so that VPN client 108 and VPN client 208 are both communicating with VPN server 130.

Figure 13:
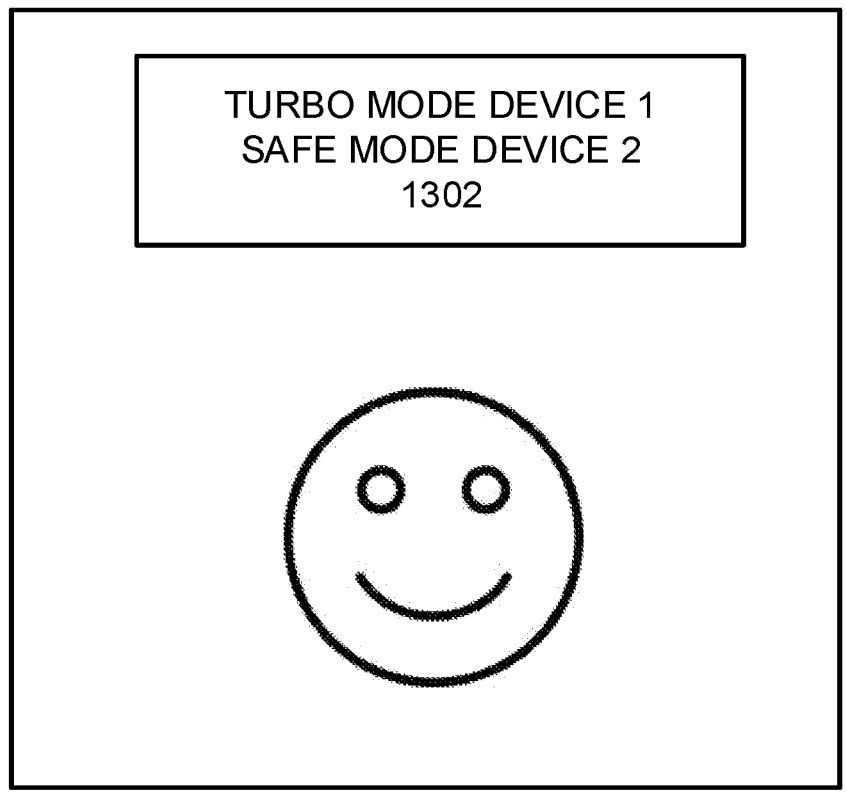
FIG. 13 is an exemplary screen shot that may appear in exemplary transmission modes in accordance with one or more exemplary embodiments of the present invention.

In an exemplary embodiment of the present invention, VPN client 208 provides VPN client 108 with information regarding the mode in which VPN client 208 is operating. The different modes include bonded mode and mirrored mode (or a hybrid of the two). For example, VPN client 208 may communicate in which of the two modes communication is occurring. VPN client 208 can communicate the mode that selected to VPN client 108 via a variety of mechanisms, such as a control channel between the two VPN clients, placing the mode information in the header of packets being transmitted from VPN client 208 to VPN client 108, further encapsulating data as it is transmitted between the two computer devices and placing the mode information in that header, etc. Because VPN client 108 knows in which mode VPN client 208 is operating, VPN client 108 can inform client 104 of this mode. As a result, it is possible to display in which mode the VPN associated with second computer devices operating on a screen associated with first computer device 102. Thus, for example, the screen associated with first computer device 102 can illustrate the mode 1302 in which first computer device 102 operates, the mode in which second computer device 202 operates, and/or the mode in which both computer devices operate. An exemplary screen display is illustrated in FIG. 13.

The above explanation has referred to two modes, a bonded channel mode and a mirrored channel mode (and a hybrid), but it is understood that other modes may exist, and a visual display may be provided to a user indicating that communication is occurring (or not occurring) in one of the further modes (on a VPN local to a user or a VPN remote from a user). A further exemplary mode is a mode in which the data transmission error rate is too high for reliable transmission. In such a mode, for example, data transmission may be temporarily suspended until transmission conditions improve. Thus, the above embodiments may entail one or more VPN's entering a mode other than the illustrative modes indicated above. The mode may be "transmission suspended" and the visual display may refer to any VPN that is being monitored. The further mode, such as "transmission suspended" may be displayed based on a positive event (i.e., a message is received that data transmission is not occurring), or based on a negative event, such as the absence of received data.

The above embodiments have described the use of messages that appear on screens indicating that mode transition has occurred. It is understood that other types of information may be provided to a user in place of or in addition to the messages that are illustrated in the exemplary embodiments described above. For example, statistics may be provided to a user before and/or after a transition so the user can see information regarding communication. The user can see, for example, how the use of bonded communication has increased bandwidth compared to single path communication. The user can see how the use of mirrored communication has decreased error rate. Other statistics can also be provided so that the user can see the effects of the features described above, including delay, jitter, etc.

Figure 14:
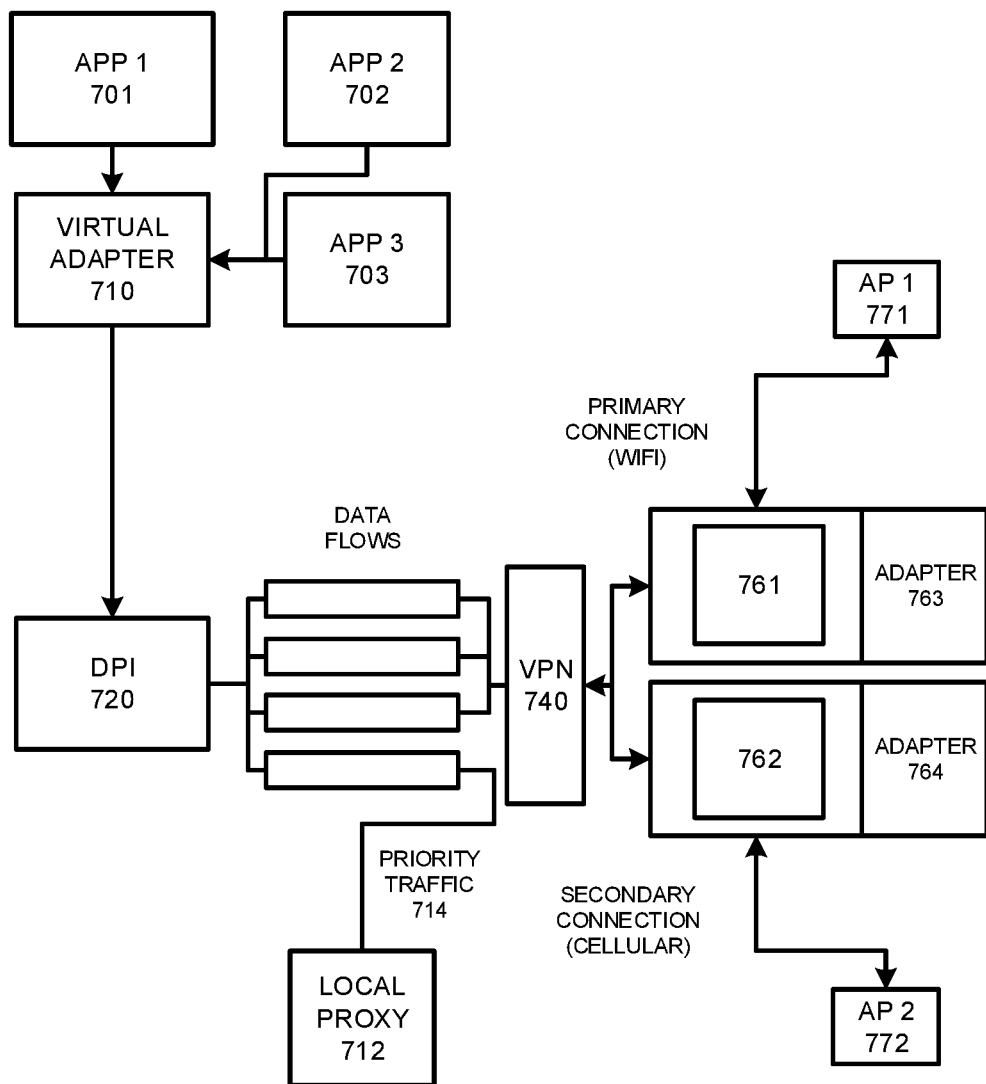
FIG. 14 is a block diagram that illustrates transmission of data in parallel to multiple access points in accordance with one or more exemplary embodiments of the present invention.

FIG. 14 illustrates a further exemplary embodiment of the present invention. Applications 701, 702 and 703 transmit data to (and subsequently receive from) virtual adapter interface 710 so that packets can be pushed into the regular networking stack. Virtual adapter interface 710 is a virtual interface that accepts IP packets from Applications 701, 702 and 703. A TUN interface is preferably used due to its ability to establish a VPN connection—since it gives the VPN software a chance to encrypt data before it is transmitted to the WAN.

Data from virtual adapter 710 (such as a TUN) is received by deep packet inspection (DPI) 720. DPI 720 identifies packet flows (rather than packet-by-packet analysis) which are then provided to VPN client 740. VPN client 740 schedules each packet for an available (or multiple available) access point. Depending upon which access point each packet is scheduled to use, packets may be output to connection modules that include (DTLS, for example) encryption modules 761, 762 respectively. Each received packet is encrypted, respectively, before being output to access points 771, 772. Output to each respective access point is achieved via adapters 763, 764.

While two access points and associated connection modules are shown, this is merely exemplary as there may be more access points. In addition, an access point may become unavailable and a different access point may be used in place of the access point that became unavailable. In some embodiments, an access point is added to currently available (or previously available) access points.

Each connection module may measure statistics regarding data that is sent over its respective access point. For example, each connection module can insert a packet with a timestamp in data streams that are transmitted to access points 771, 772. Some of these timestamp packets request respective responses from the destination server. The destination server responds, and the time of receipt of each response is compared with the time the timestamp packet was initially sent. In this manner it is possible to calculate delay and jitter. Furthermore, the responding packet may indicate whether the initial timestamp packet was received with errors. Thus, the connection modules can also determine error rate of connections on respective channels. Each packet, after encrypted, is transmitted to an access point via adapters 763 or 764.

In one embodiment, packets with timestamps lack other application specific data (sent between an application and a server). Such packets may be transmitted on a control channel and/or a data channel. In other embodiments, packets with timestamps also include application specific data (sent between an application and a server). In those embodiments, each packet is thus performing two or more functions, i.e., each packet is transmitting application data between an application(s) and a server(s) and each packet includes timestamp data for measuring statistics such as latency. By combining multiple functions into a packet, efficiencies in data communication are obtained.

Each access point may be coupled to a respectively different connection, some with a respectively different protocol. Exemplary protocols include Wi-Fi, a second Wi-Fi, cellular, a second cellular, Ethernet, satellite, etc.

Selection of which access point to use for data packet transmission may change based on a variety of measurements, including jitter, error, latency, delay, etc. Also, one access point may be used (and preferred for use) over another access point, on a basis such as cost, preference, security, etc. Measurements may be evaluated over a period of time, in order to generate statistics relating to those measurements. Statistics may be provided (displayed) to a user. A user may view statistics both before and after changes occur regarding data transmission, use of access points, allocation of data on one or more access points, use of TCP protocol compared to use of UDP protocol as the transport protocol (based on or independent of protocol of the application), use of other protocols, transition from one (transport) protocol to another (if the application protocol changes, or if the application protocol does not change), etc.

Assume for example that two access points are available for data communication. Access Point 1 (AP1) 771 provides Wi-Fi communication (which may be free to most users). Access Point 2 (AP2) 772 may provide cellular communication (which may require payment, or may have capacity limits, or may have some other disadvantages compared to Access Point 1). In order to reduce costs, VPN client 740 directs all data transmission to AP1 771. As data transmission proceeds, at some point, connection module 761 determines that one or more statistics are unacceptably having an adverse effect on data transmission. Accordingly, VPN client 740 shifts a percentage of data to AP2 772. The amount of shift may depend upon factors such as cost, the needs of users (at the source and/or destination), the type of transmission (VoIP, streaming audio, streaming video, e-mail, etc.). As data transmission continues, statistics are continually monitored, and percentage (or amount) of data transmitted through each access point may be continuously changed. Furthermore, another access point (if available) may be added (made available) for subsequent data transmission, or a previously used access point may no longer be used.

In the above manner, the percentage of data being transmitted on each Access Point may dynamically change as data transmission continues. Transitioning the amount of data sent on each Access Point may be based on one or more statistics, such as delay, jitter, error, etc. In some embodiments, a transition occurs when delay, jitter, and/or error meets or crosses a certain threshold. That threshold can change depending upon the attributes of networks that are potential candidates for receiving an increased amount of data. Statistics can be provided to one of more users. The statistics can also be provided to show statistics before and/or after a transition occurs.

In other exemplary embodiments, transition to differing amounts (or non-use, or 100% use) of data transmission over respective access points may be based on a calculation that receives as input more than one of the above statistics. For example, a mean opinion score (MOS) can be calculated based on latency and jitter, so that effective latency is obtained. Effective latency is then used to calculate MOS. Depending upon the MOS, amounts of data on respective channels can be shifted until a desired MOS is obtained. Once a desired MOS is obtained, the resulting allocation may be more expensive than before the shift. Test packets can be sent over an unused (and cheaper) channel until statistics regarding the test packets indicate that a desired MOS can be obtained on the cheaper channel. At that time, allocation of packets can be shifted so that more (or all) packets are transmitted on the cheaper channel. Statistics relating to changes of allocation can be provided to a user. MOS is merely an example of a calculation that may be used with regard to allocation.

The above explanation has included TCP and UDP as examples, but this is merely to illustrate aspects of the present invention. The protocols subject to transition may be protocols that provide end-to-end communication. The protocols may be Transport Layer protocols. The protocols may be different protocols of data after being encapsulated. The protocols may be different protocols of data before being encapsulated. The protocols may be different protocols that provide data transfer between applications. The protocols may be associated with one or more layers of a layered architecture (e.g., OSI, Internet protocol suite). Exemplary protocols included TCP, UDP, and HTTPS.

The above explanations have referred to "encryption," but it is understood that encryption is only one aspect of the present invention. Thus, where "encryption" is described, the present invention may relate to encapsulation with or without encryption. Similarly, where "decryption" is described, the present invention may relate to decapsulation with or without decryption. For example, while a carrier layer is described above, data that is transported on the carrier layer may be encapsulated and subsequently decapsulated. All references to protocol set forth above may relate to data that is subject to encapsulation (with or without encryption), with the understanding that all references to encryption above may alternatively relate to encapsulation.

The above explanation may relate to network sockets, but the sockets may be individual sockets and/or multiple sockets. Thus, multiple sockets may exist between an application and a destination over a network, and data may be transmitted over multiple sockets in parallel. The presence of this feature raises the further feature of applying different aspects of the above exemplary embodiments to different sockets over which an application communicates in parallel. For example, one socket may include data transmission at a carrier level using one protocol (e.g., TCP protocol) while another socket may include data transmission at a carrier level using another protocol (e.g. UDP protocol). These exemplary protocols may be used dependent on the application protocol, independent of the application protocol, and/or dependent upon some other factor as described in the exemplary embodiments above. Furthermore, multiple sockets may relate to data transmission in a mirrored mode, or a bonded mode, and there may be a transition from one mode to another, for example in the manner described above in other exemplary embodiments. Other aspects of the above embodiments may also apply, such as amount of data allocation to two or more multiple sockets, allocation/transition on one or more sockets combined with allocation/transition on one or more channels, etc.

The above explanation has described embodiments relating to protocol transitions in a single layer (e.g., Transport Layer), but this is merely exemplary. The protocol transitions may occur in another layer other than the example described above, for example in a layer above the Transport Layer and/or a layer below the Transport Layer. Furthermore, while exemplary protocol transition that may occur in the OSI model or Internet protocol suite, this is merely exemplary, as the transition may occur in a layer of another communications model. The above explanations may also relate to transition of protocols in multiple layers of a layered architecture, i.e., transitions, and/or data allocations may occur in one layer of a layered architecture and another layer of that layered architecture.

The above explanation has been with regard to a client computer initiating communication with a server, but this is merely exemplary. In a further exemplary embodiment of the present invention, the server may initiate communication with the client computer. In such an exemplary embodiment, the communication from the server to the client computer may include multiple attempts to communicate and with one or more of the variations (e.g., network access, protocol, etc.) described above.

The drawings included herein do not show a DNS server. It is understood that a DNS server may be included in any of the disclosed embodiments.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Figure 15:
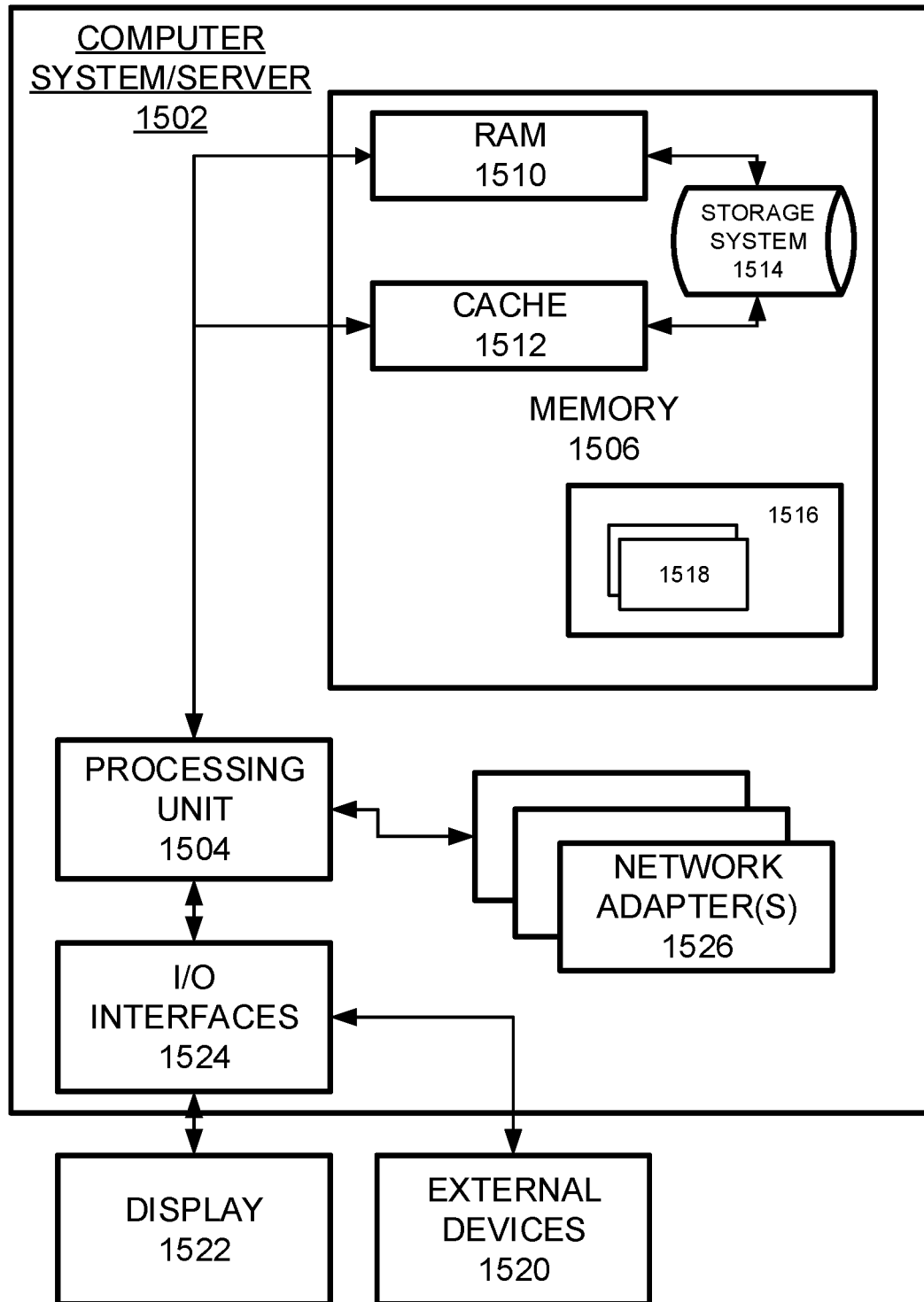
FIG. 15 is a computer system configuration which may be implemented as a platform for one or more of the example embodiments.

FIG. 15 illustrates an example network entity device configured to store instructions, software, and corresponding hardware for executing the same according to example embodiments. FIG. 15 is not intended to suggest any limitation as to the scope of use or functionality of embodiments of the application described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 15, computer system/server 1502 in cloud computing node 1500 is displayed in the form of a general-purpose computing device. The components of computer system/server 1502 may include, but are not limited to, one or more processors or processing units 1504, a system memory 1506, and a bus that couples various system components including system memory 1506 to processor 1504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media. System memory 1506, in one embodiment, implements the flow diagrams of the other figures. The system memory 1506 can include computer system readable media in the form of volatile memory, such as random-access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1506 may include at least one program product having a set (e.g., at least one) of program modules that are configured to carry out the functions of various embodiments of the application.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter(s) 1526. As depicted, network adapter(s) 1526 communicates with the other components of computer system/server 1502 via a bus. It should be understood that although not displayed, other hardware and/or software components could be used in conjunction with computer system/server 1502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method comprising:
operating a plurality of applications on a computer device, wherein a first application is a higher priority application than a second application of the plurality of applications;
transmitting, via the computer device, packets over a first channel of a Wi-Fi network and a second channel of a cellular network bonded with the first channel, wherein the transmitted packets are associated with each of the plurality of applications;
determining one or more of the first and second channels experienced a network communication error;
retransmitting packets associated with only the higher priority application over a mirrored channel transmission comprising the first and second channels both retransmitting in parallel duplicated packets on both the first and second channels; and
transmitting subsequent packets associated with only the second application over the bonded first and second channels, and wherein the transmitted subsequent packets associated with only the second application comprises unique packets being transmitted on both the first and second channels.

2. The method of claim 1, wherein a larger number of the retransmitted packets are transmitted over the first channel and a lesser number of the retransmitted packets are transmitted over the second channel.

3. The method of claim 2, wherein the lesser number of the retransmitted packets are each duplicated in the larger number of the retransmitted packets.

4. The method of claim 1, wherein when the computer device has not received an acknowledgement (ACK) that a first portion of the plurality of packets were received by another computer device, determining the network communication error.

5. The method of claim 1, wherein when the computer device has received an indication that a first portion of the plurality of packets were received with errors by another computer device, determining the network communication error.

6. The method of claim 1, wherein the retransmitting the packets over the mirrored channel transmission is performed after a period of time has lapsed.

7. The method of claim 1, wherein the network communication error comprises one or more of jitter, latency, packet loss and bandwidth degradation.

8. A computer device comprising:
a processor configured to operate a plurality of applications, wherein a first application is a higher priority application than a second application of the plurality of applications;
a transmitter configured to transmit packets over a first channel of a Wi-Fi network and a second channel of a cellular network bonded with the first channel, wherein the transmitted packets are associated with each of the plurality of applications;
wherein the processor is further configured to
determine one or more of the first and second channels experienced a network communication error;
wherein the transmitter is further configured to retransmit the packets associated with the higher priority application over a mirrored channel transmission comprising the first and second channels both retransmit in parallel duplicated packets on both the first and second channels; and transmit subsequent packets associated with only the second application over the bonded first and second channels, and wherein the transmitted subsequent packets associated with only the second application comprises unique packets being transmitted on both the first and second channels.

9. The computer device of claim 8, wherein a larger number of the retransmitted packets are transmitted over the first channel and a lesser number of the retransmitted packets are transmitted over the second channel.

10. The computer device of claim 9, wherein the lesser number of the retransmitted packets are each duplicated in the larger number of the retransmitted packets.

11. The computer device of claim 8, wherein when the computer device has not received an acknowledgement (ACK) that a first portion of the plurality of packets were received by another computer device, the processor determines the network communication error.

12. The computer device of claim 8, wherein when the computer device has received an indication that a first portion of the plurality of packets were received with errors by another computer device, the processor determines the network communication error.

13. The computer device of claim 8, wherein the retransmission of the packets over the mirrored channel transmission is performed after a period of time has lapsed.

14. The computer device of claim 8, wherein the network communication error comprises one or more of jitter, latency, packet loss and bandwidth degradation.

15. A non-transitory computer readable storage medium configured to store instructions that when executed cause a processor to perform:
  operating a plurality of applications on a computer device, wherein a first application is a higher priority application than a second application of the plurality of applications;
  transmitting, via the computer device, packets over a first channel of a Wi-Fi network and a second channel of a cellular network bonded with the first channel, wherein the transmitted packets are associated with each of the plurality of applications;
  determining one or more of the first and second channels experienced a network communication error;
  retransmitting packets associated with only the higher priority application over a mirrored channel transmission comprising the first and second channels retransmit retransmitting in parallel duplicated packets on both the first and second channels; and
  transmitting subsequent packets associated with only the second application over the bonded first and second channels, and wherein the transmitted subsequent packets associated with only the second application comprises unique packets being transmitted on both the first and second channels.

16. The non-transitory computer readable storage medium of claim 15, wherein a larger number of the retransmitted packets are transmitted over the first channel and a lesser number of the retransmitted packets are transmitted over the second channel.

* * * * *